United States Patent
Kang et al.

(10) Patent No.: US 10,410,032 B2
(45) Date of Patent: Sep. 10, 2019

(54) FINGERPRINT SENSOR, ELECTRONIC DEVICE HAVING THE SAME, AND METHOD OF OPERATING THE FINGERPRINT SENSOR

(71) Applicant: Samsung Electronics Co., ltd., Suwon-si, Gyeonggi-do (KR)

(72) Inventors: Shin-Wuk Kang, Seongnam-si (KR); Sun-Kwon Kim, Yongin-si (KR); Jin-Uk Jeon, Ansan-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 237 days.

(21) Appl. No.: 15/393,682

(22) Filed: Dec. 29, 2016

(65) Prior Publication Data

US 2017/0255806 A1    Sep. 7, 2017

(30) Foreign Application Priority Data

Mar. 2, 2016  (KR) .................. 10-2016-0025062

(51) Int. Cl.
   *G06K 9/00*   (2006.01)
(52) U.S. Cl.
   CPC ................... *G06K 9/0002* (2013.01)
(58) Field of Classification Search
   USPC ............... 235/439; 349/39; 382/108, 124
   See application file for complete search history.

(56) References Cited

U.S. PATENT DOCUMENTS

| | | | |
|---|---|---|---|
| 6,681,033 B1* | 1/2004 | Yano | G01D 5/24 382/108 |
| 6,937,031 B2 | 8/2005 | Yoshioka et al. | |
| 7,298,875 B2 | 11/2007 | Kim et al. | |
| 7,613,334 B2 | 11/2009 | Morgeneier et al. | |
| 7,688,370 B2 | 3/2010 | Hur et al. | |
| 8,005,276 B2* | 8/2011 | Dean | G06K 9/00013 382/124 |
| 8,618,865 B1 | 12/2013 | Lu | |
| 9,152,841 B1 | 10/2015 | Riedijk | |
| 9,158,958 B2* | 10/2015 | Wickboldt | G06K 9/00026 |

(Continued)

FOREIGN PATENT DOCUMENTS

KR    10-0473383 B1    3/2005
KR    10-0531769 B1    11/2005

(Continued)

*Primary Examiner* — Xuemei G Chen
(74) *Attorney, Agent, or Firm* — Harness, Dickey & Pierce, P.L.C.

(57) ABSTRACT

A fingerprint sensor includes a pixel array and a controller. The pixel array includes a plurality of unit pixels arranged in rows and columns, each of the plurality of unit pixels including, a sensing electrode configured to form a detection capacitance with a finger, a signal generation circuit configured to output an analog signal through a column line based on the detection capacitance, and a protection circuit configured to control a voltage transfer between the sensing electrode and a common line. The controller is configured to control the protection circuit in each of the plurality of unit pixels to transfer a voltage at the sensing electrode of an active unit pixel of the plurality of unit pixels to the sensing electrode in at least one protection unit pixel of the plurality of unit pixels through the common line.

20 Claims, 13 Drawing Sheets

(56) References Cited

U.S. PATENT DOCUMENTS

| | | | |
|---|---|---|---|
| 9,767,339 B1* | 9/2017 | He | G06K 9/00087 |
| 10,074,004 B2* | 9/2018 | Xu | G06F 3/0416 |
| 10,082,918 B2* | 9/2018 | Hekmatshoartabari | G06F 3/044 |
| 10,209,836 B2* | 2/2019 | Qin | G06F 3/044 |
| 2003/0190061 A1* | 10/2003 | Chou | G06K 9/0002 382/124 |
| 2009/0009673 A1* | 1/2009 | Hisada | G02F 1/1362 349/39 |
| 2012/0085822 A1* | 4/2012 | Setlak | G06K 9/0002 235/439 |
| 2014/0333328 A1* | 11/2014 | Nelson | G06F 3/044 324/663 |
| 2016/0042216 A1* | 2/2016 | Yang | G06K 9/0002 382/124 |
| 2016/0048717 A1* | 2/2016 | Yang | G06K 9/00087 382/124 |
| 2016/0110581 A1* | 4/2016 | Heo | G06K 9/0002 382/124 |
| 2016/0171275 A1* | 6/2016 | Wang | G06K 9/00053 382/124 |
| 2016/0227142 A1* | 8/2016 | Lin | G06K 9/00013 |
| 2016/0307021 A1* | 10/2016 | Kim | G06K 9/0002 |
| 2016/0350577 A1* | 12/2016 | Yang | G06K 9/0002 |
| 2017/0017828 A1* | 1/2017 | Bernstein | G06K 9/00053 |
| 2017/0161536 A1* | 6/2017 | Lin | G06K 9/0002 |

FOREIGN PATENT DOCUMENTS

| | | | |
|---|---|---|---|
| KR | 10-0672619 B1 | 1/2007 | |
| KR | 10-1502911 B1 | 3/2015 | |

* cited by examiner

FINGERPRINT SENSOR, ELECTRONIC DEVICE HAVING THE SAME, AND METHOD OF OPERATING THE FINGERPRINT SENSOR

CROSS-REFERENCE TO RELATED APPLICATION(S)

This application claims priority under 35 U.S.C. § 119 to Korean Patent Application No. 10-2016-0025062, filed on Mar. 2, 2016 in the Korean Intellectual Property Office (KIPO), the contents of which are herein incorporated by reference in their entirety.

BACKGROUND

1. Technical Field

Example embodiments relate to a fingerprint sensor.

2. Description of the Related Art

Generally, a fingerprint sensor obtains a fingerprint image of a finger by detecting a capacitance between a sensing electrode and a finger. For example, a fingerprint sensor may obtain a fingerprint image of a finger based on a capacitance between the finger and a sensing electrode included in a pixel on which a ridge of a fingerprint is located and a capacitance between the finger and a sensing electrode included in a pixel on which a valley of the fingerprint is located.

A parasitic capacitor is generally formed among the sensing electrodes, and the parasitic capacitor causes a noise element in a signal, which is generated based on the capacitance between the sensing electrode and the finger.

SUMMARY

A sensing performance of a fingerprint sensor is decreased if an effect of the parasitic capacitor exists while the fingerprint sensor performs a sensing operation. Some example embodiments are directed to provide a fingerprint sensor that reduces an effect of a parasitic capacitor formed among sensing electrodes in unit pixels.

Some example embodiments are directed to provide an electronic device including the fingerprint sensor.

Some example embodiments are directed to provide a method of operating the fingerprint sensor.

According to example embodiments, a fingerprint sensor includes a pixel array and a controller. The pixel array includes a plurality of unit pixels arranged in rows and columns, each of which includes a sensing electrode forming a detection capacitance with a finger, a signal generation circuit outputting an analog signal through a column line based on the detection capacitance, and a protection circuit controlling a voltage transfer between the sensing electrode and a common line. The controller controls an operation of the pixel array. The controller controls the protection circuit in each of the plurality of unit pixels to transfer a voltage at the sensing electrode of an active unit pixel to the sensing electrode of at least one protection unit pixel through the common line, the active unit pixel being of the plurality of unit pixels, the at least one protection unit pixel being of the plurality of unit pixels, the at least one protection unit pixel being adjacent to the active unit pixel and the active pixel unit being a sensed unit pixel.

According to example embodiments, an electronic device includes a fingerprint sensor and an application processor. The fingerprint sensor includes a plurality of unit pixels having a sensing electrode. The fingerprint sensor transfers a voltage at the sensing electrode of an active unit pixel to the sensing electrode of at least one protection unit pixel, the active unit pixel being of the plurality of unit pixels, the at least one protection unit pixel being of the plurality of unit pixels, the at least one protection unit pixel being adjacent to the active unit pixel, the active unit pixel being a sensed unit pixel and the fingerprint sensor further configured to generate a digital signal based on the detection capacitance, the detection capacitance being formed by the sensing electrode of the active unit pixel and a user's finger. The application processor authenticates the user based on the digital signal.

In a method of operating a fingerprint sensor including a plurality of unit pixels arranged in rows and columns, where each of the plurality of unit pixels includes a sensing electrode, a signal generation circuit which generates an analog signal based on a detection capacitance formed by the sensing electrode and a user's finger, and a protection circuit which controls a voltage transfer between the sensing electrode and a common line, a voltage formed at the sensing electrode of an active unit pixel among the plurality of unit pixels is transferred to the sensing electrode of at least one protection unit pixel, which is adjacent to the active unit pixel, among the plurality of unit pixels through the common line, the analog signal is generated based on the detection capacitance, is the detection capacitance formed by the sensing electrode of the active unit pixel and the user's finger, and a digital signal corresponding to a fingerprint of the user is generated based on the analog signal.

According to at least one example embodiment, an image sensor includes a pixel array and a controller. The pixel array includes a plurality of unit pixels, a plurality of common lines and a plurality of column lines, the plurality of pixels operably connected to the plurality of common lines and the plurality of column lines. The controller is configured to determine at least one of the plurality of unit pixels as an active unit pixel, the active unit pixel being contacted by an object and control at least one adjacent unit pixel of the plurality of unit pixels to connect to one of the plurality of common lines, the at least one adjacent unit being adjacent to the active unit pixel, the active unit pixel configured to transfer a voltage corresponding to the contact to the one of the plurality of common lines.

BRIEF DESCRIPTION OF THE DRAWINGS

Illustrative, non-limiting example embodiments will be more clearly understood from the following detailed description in conjunction with the accompanying drawings.

DETAILED DESCRIPTION OF EXAMPLE EMBODIMENTS

Figure 1:
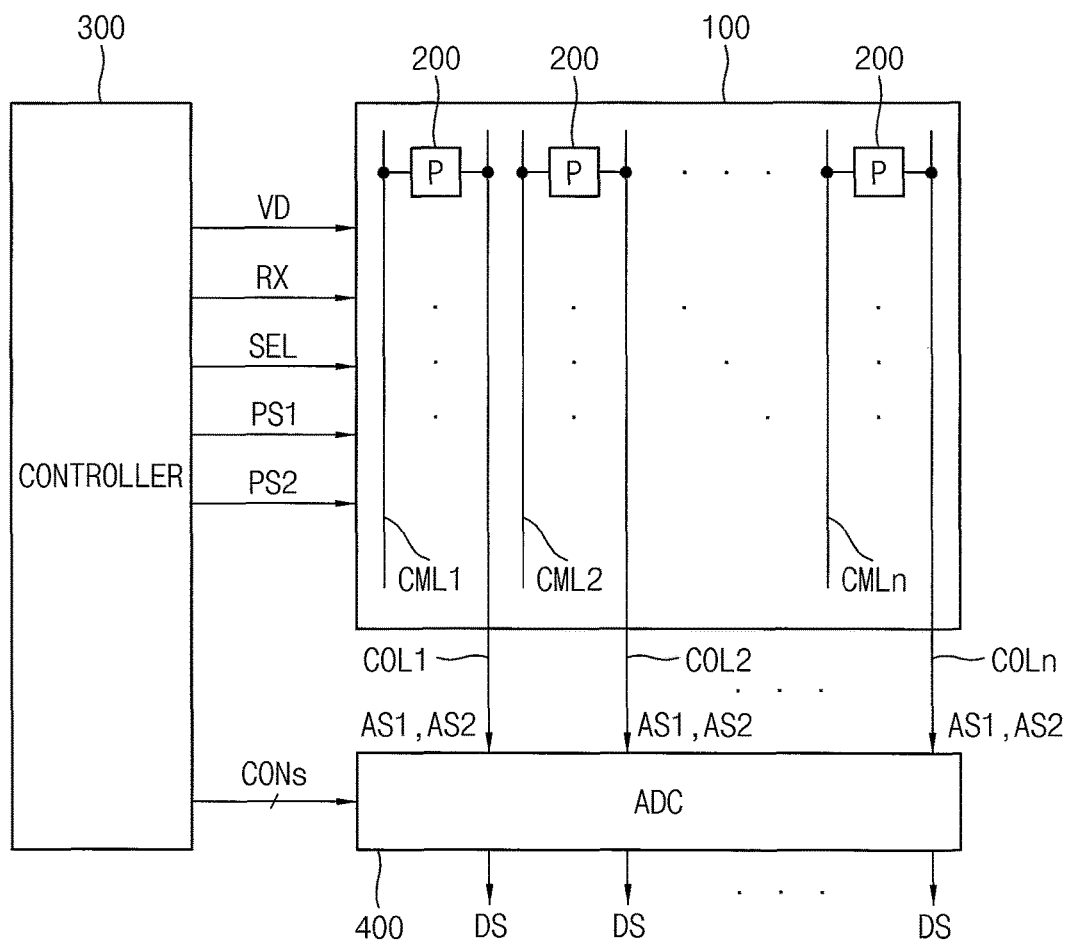
FIG. 1 is a block diagram illustrating a fingerprint sensor according to example embodiments.

FIG. 1 is a block diagram illustrating a fingerprint sensor according to example embodiments.

Referring to FIG. 1, a fingerprint sensor 10 includes a pixel array 100, a controller 300, and an analog-to-digital converter ADC 400.

The pixel array 100 may include a plurality of unit pixels P 200 arranged in rows and columns. A plurality of common lines CML1, CML2, . . . , CMLn and a plurality of column lines COL1, COL2, . . . , COLn may be formed on the pixel array 100 in a column direction. The unit pixels 200 arranged in a same column may be coupled to a same common line CMLk and a same column line COLk. Here, n represents a positive integer, and k represents a positive integer equal to or smaller than n.

The controller 300 may provide a drive voltage VD to each of the plurality of unit pixels 200. In addition, the controller 300 may control an operation of the pixel array 100 in a unit of a row using a reset control signal RX, a row selection signal SEL, a first protection signal PS1, and a second protection signal PS2.

The controller 300 may be implemented in hardware, a processor configured to execute software, firmware, or any combination thereof, for example. When the controller 300 is hardware, such existing hardware may include one or more Central Processing Units (CPUs), digital signal processors (DSPs), application-specific-integrated-circuits (ASICs), field programmable gate arrays (FPGAs) computers or the like configured as special purpose machines to perform the functions of the controller 300. CPUs, DSPs, ASICs and FPGAs may generally be referred to as processing devices.

In the event where the controller 300 is a processor executing software, the processor is configured as a special purpose machine to execute the software, stored in a storage medium, to perform the functions of the controller 300. In such an embodiment, the processor may include one or more Central Processing Units (CPUs), digital signal processors (DSPs), application-specific-integrated-circuits (ASICs), field programmable gate arrays (FPGAs) computers.

When a finger contacts the pixel array 100 (e.g., is on the pixel array 100), each of the plurality of unit pixels 200 included in the pixel array 100 may generate an analog signal by detecting a fingerprint pattern of the finger. In some example embodiments, the plurality of unit pixels 200 may output a first analog signal AS1, which corresponds to a reset element, and a second analog signal AS2, which corresponds to a fingerprint of the finger, alternately through the plurality of column lines COL1, COL2, . . . , COLn in a unit of a row.

Figure 2:
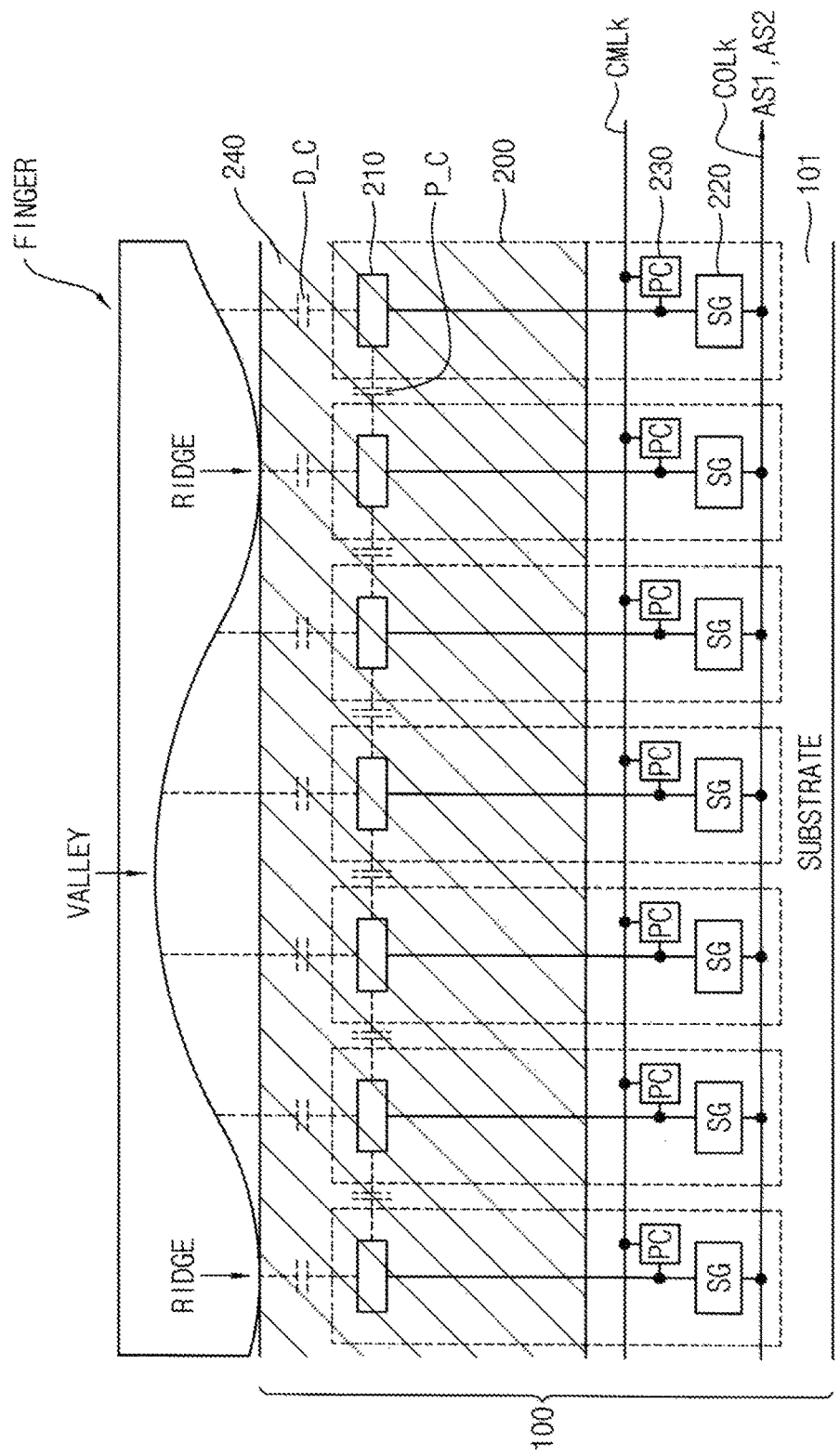
FIG. 2 is a cross-sectional view illustrating an example of a pixel array included in the fingerprint sensor of FIG. 1.

FIG. 2 is a cross-sectional view illustrating an example of a pixel array included in the fingerprint sensor of FIG. 1.

A cross-sectional view of the pixel array 100 along the column direction is illustrated in FIG. 2.

Referring to FIG. 2, each of the plurality of unit pixels 200 included in the pixel array 100 may include a sensing electrode 210, which is formed above a semiconductor substrate 101, a signal generation circuit SG 220, which is formed on the semiconductor substrate 101, and a protection circuit PC 230, which is formed on the semiconductor substrate 101.

The sensing electrode 210 included in each of the plurality of unit pixels 200 may be electrically connected to the corresponding signal generation circuit 220. In addition, the protection circuit 230 included in each of the plurality of unit pixels 200 may control a voltage transfer between the corresponding sensing electrode 210 and the corresponding common line CMLk.

In some example embodiments, the sensing electrode 210 may be implemented as a metal plate including a metal material.

The pixel array 100 may further include an insulation layer 240, which is formed above the semiconductor substrate 101 and covers the sensing electrode 210 of each of the plurality of unit pixels 200. In some example embodiments, at least a portion of the insulation layer 240 formed above the sensing electrode 210 may include glass.

FIG. 2 represents a state when a finger is on the insulation layer 240 included in the pixel array 100.

When the finger contacts the pixel array 100, the finger may operate as an electrode. Therefore, the sensing electrode 210 included in each of the plurality of unit pixels 200 may form a detection capacitor D_C together with the finger.

Generally, a fingerprint of a person has an intrinsic pattern formed by a ridge and a valley.

Therefore, as illustrated in FIG. 2, a distance between the finger and the sensing electrode 210 included in the unit pixel 200 on which a ridge of the fingerprint is located may be smaller than a distance between the finger and the sensing electrode 210 included in the unit pixel 200 on which a valley of the fingerprint is located.

Since a capacitance of a capacitor is inversely proportional to a distance between two electrode of the capacitor, a capacitance of the detection capacitor D_C formed by the sensing electrode 210 included in the unit pixel 200 on which a ridge of the fingerprint is located may be greater than a capacitance of the detection capacitor D_C formed by the sensing electrode 210 included in the unit pixel 200 on which a valley of the fingerprint is located.

The signal generation circuit 220 included in each of the plurality of unit pixels 200 may output the first analog signal AS1 representing the reset element and the second analog signal AS2 having a magnitude determined based on a capacitance of the detection capacitor D_C formed by the corresponding sensing electrode 210 and the finger alternately through the corresponding column line COLk.

As illustrated in FIG. 2, a parasitic capacitor P_C may be formed between the sensing electrodes 210 included in the plurality of unit pixels 200. Therefore, the parasitic capacitor P_C may cause a noise element in the second analog signal AS2, which is generated based on the capacitance of the detection capacitor D_C formed by the corresponding sensing electrode 210 and the finger. As such, a sensing performance of the fingerprint sensor 10 may be decreased if an effect of the parasitic capacitor P_C is not eliminated while the signal generation circuit 220 generates the second analog signal AS2 based on the capacitance of the detection capacitor D_C.

In the fingerprint sensor 10 according to example embodiments, each of the plurality of unit pixels 200 may include the protection circuit 230 controlling a voltage transfer between the corresponding sensing electrode 210 and the corresponding common line CMLk under a control of the controller 300.

In an operation of the fingerprint sensor 10, when the finger contacts the pixel array 100, the controller 300 may control the protection circuit 230 included in each of the plurality of unit pixels 200 to transfer a voltage formed at the sensing electrode 210 included in an active unit pixel, on which a sensing operation is performed, among the plurality of unit pixels 200 to the sensing electrode 210 included in at least one protection unit pixel, which is adjacent to the active unit pixel, among the plurality of unit pixels 200 through the corresponding common line CMLk.

Therefore, the sensing electrode 210 included in the at least one protection unit pixel, which is adjacent to the active unit pixel, and the sensing electrode 210 included in the active unit pixel may be maintained at substantially the same voltage.

Since both electrodes of the parasitic capacitor P_C, which correspond to the sensing electrode 210 included in the active unit pixel and the sensing electrode 210 included in the at least one protection unit pixel, are maintained at substantially the same voltage, an effect of the parasitic capacitor P_C on the sensing operation for the active unit pixel may be eliminated or reduced. Therefore, a sensing performance of the fingerprint sensor 10 may be effectively increased.

Although the plurality of common lines CML1, CML2, . . . , CMLn are described to be formed on the pixel array 100 in the column direction with reference to FIGS. 1 and 2, example embodiments are not limited thereto. According to example embodiments, the plurality of common lines CML1, CML2, . . . , CMLn may be formed on the pixel array 100 in any direction. In this case, the unit pixels 200 arranged in the same direction as the common line CMLk may be commonly coupled to the common line CMLk.

Therefore, the fingerprint sensor 10 according to example embodiments may transfer a voltage formed at the sensing electrode 210 included in the active unit pixel, on which a sensing operation is performed, among the plurality of unit pixels 200 to the sensing electrode 210 included in the at least one protection unit pixel, which is adjacent to the active unit pixel in the same direction as the common line CMLk, among the plurality of unit pixels 200 through the corresponding common line CMLk.

Therefore, the sensing electrode 210 included in the at least one protection unit pixel, which is adjacent to the active unit pixel in the same direction as the common line CMLk, and the sensing electrode 210 included in the active unit pixel may be maintained at substantially the same voltage.

Hereinafter, for ease of explanation, the plurality of common lines CML1, CML2, . . . , CMLn will be described to be formed on the pixel array 100 in the column direction.

Figure 3:
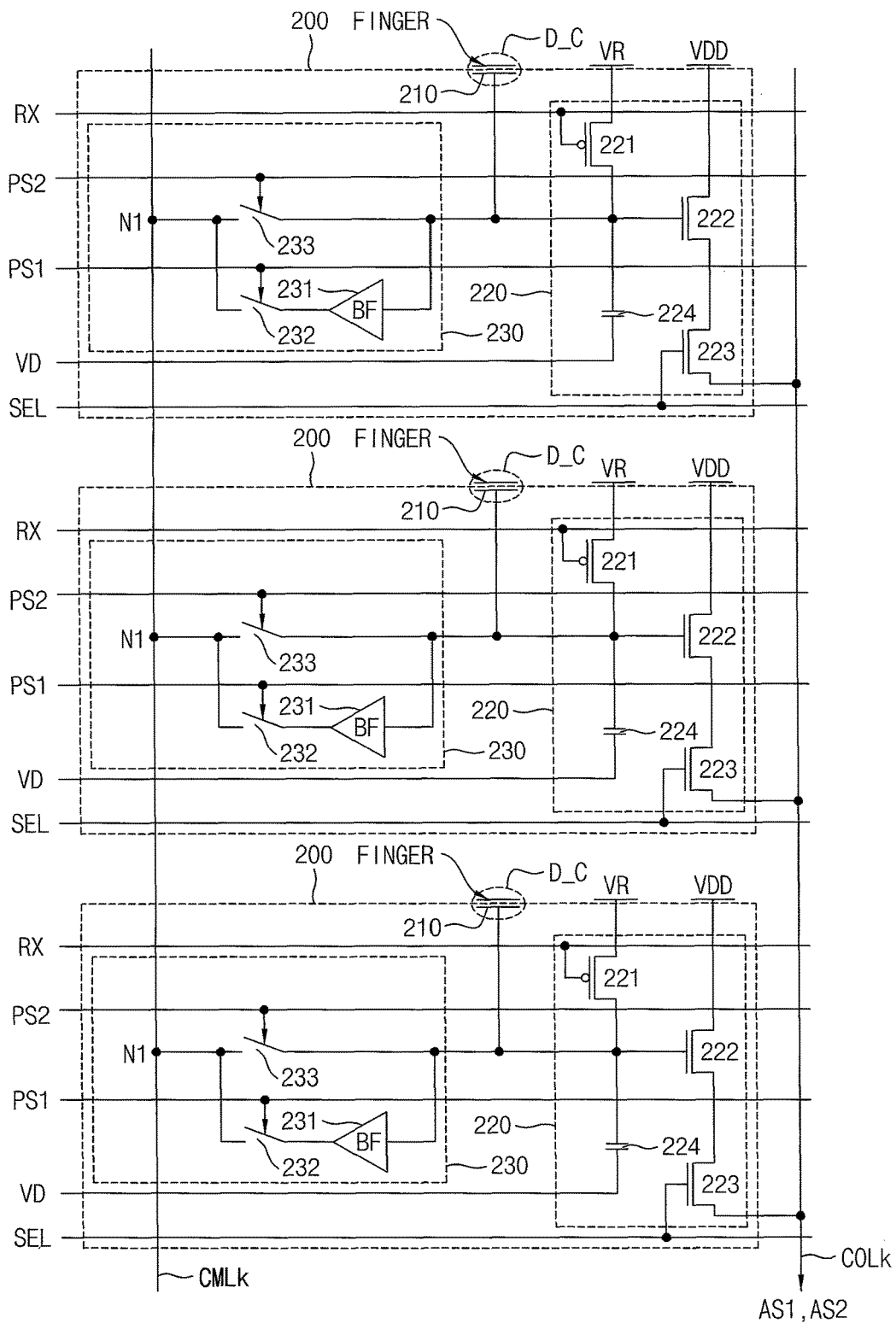
FIG. 3 is a circuit diagram illustrating an example of a pixel array included in the fingerprint sensor of FIG. 1.

FIG. 3 is a circuit diagram illustrating an example of a pixel array included in the fingerprint sensor of FIG. 1.

In FIG. 3, three unit pixels 200 that are adjacent to each other in the column direction are illustrated.

Referring to FIG. 3, each of the plurality of unit pixels 200 may include the sensing electrode 210, the signal generation circuit 220, and the protection circuit 230.

As illustrated in FIG. 3, the sensing electrodes 210 included in each of the plurality of unit pixels 200 may form the detection capacitor D_C together with the finger contacted on the pixel array 100.

The protection circuit 230 may include a buffer BF 231, a first protection switch 232, and a second protection switch 233.

The buffer 231 may include an input electrode coupled to the sensing electrode 210 and an output electrode coupled to the first protection switch 232.

The first protection switch 232 may be coupled between the output electrode of the buffer 231 and a first node N1 on the corresponding common line CMLk. The first protection switch 232 may be turned on in response to a first protection signal PS1 provided by the controller 300. When the first protection switch 232 is turned on, a detection voltage formed at the sensing electrode 210 may be transferred to the first node N1 on the corresponding common line CMLk through the buffer 231 and the first protection switch 232.

Since a magnitude of a current flowing in the input electrode of the buffer 231 from the sensing electrode 210 is substantially zero, the detection voltage formed at the sensing electrode 210 may not be changed although the first protection switch 232 is turned on such that the detection voltage formed at the sensing electrode 210 is transferred to the first node N1 on the corresponding common line CMLk through the buffer 231 and the first protection switch 232.

The second protection switch 233 may be coupled between the sensing electrode 210 and the first node N1 on the corresponding common line CMLk. The second protection switch 233 may be turned on in response to a second protection signal PS2 provided by the controller 300. When the second protection switch 233 is turned on, the detection voltage transferred to the corresponding common line CMLk from the unit pixel 200 adjacent in the column direction may be provided to the sensing electrode 210 through the second protection switch 233.

In some example embodiments, an activated period of the first protection signal PS1 and an activated period of the second protection signal PS2 may not be overlapped for a single unit pixel.

Therefore, the detection voltage formed at the sensing electrode 210 included in the unit pixel 200 receiving the first protection signal PS1 in an activated state may be transferred to the sensing electrode 210 included in the unit pixel 200, which is arranged in the same column and receives the second protection signal PS2 in the activated state, through the protection circuit 230 included in each of the plurality of unit pixels 200.

In some example embodiments, each of the first protection switch 232 and the second protection switch 233 may include a metal oxide semiconductor (MOS) transistor.

The signal generation circuit 220 may include a reset transistor 221, a drive transistor 222, a row selection transistor 223, and a drive capacitor 224.

The drive capacitor 224 may include a first electrode receiving the drive voltage VD from the controller 300 and a second electrode coupled to the sensing electrode 210. Therefore, when a voltage level of the drive voltage VD is changed, the detection voltage formed at the sensing electrode 210 may be changed based on a ratio of the capacitance of the detection capacitor D_C, which is formed by the sensing electrode 210 and the finger contacted on the pixel array 100, to a capacitance of the drive capacitor 224.

The reset transistor 221 may include a source coupled to a reset voltage VR, a drain coupled to the sensing electrode 210, and a gate receiving the reset control signal RX provided by the controller 300. When the reset transistor 221 is turned on in response to the reset control signal RX, the detection voltage formed at the sensing electrode 210 may be reset to the reset voltage VR.

The drive transistor 222 may include a source coupled to a drain of the row selection transistor 223, a drain coupled to a supply voltage VDD, and a gate coupled to the sensing electrode 210. The drive transistor 222 may generate an analog signal having a magnitude determined based on a voltage level of the detection voltage formed at the sensing electrode 210.

The row selection transistor 223 may include a drain coupled to the source of the drive transistor 222, a gate receiving the row selection signal SEL provided by the controller 300, and a source coupled to the corresponding column line COLk.

When the row selection transistor 223 is turned on in response to the row selection signal SEL, the analog signal generated by the drive transistor 222 may be provided to the analog-to-digital converter 400 through the corresponding column line COLk as the first analog signal AS1 and/or the second analog signal AS2.

On the other hand, when the row selection transistor 223 is turned off in response to the row selection signal SEL, the signal generation circuit 220 may be disconnected from the corresponding column line COLk.

In some example embodiments, the reset transistor 221 may be a p-type metal oxide semiconductor (PMOS) transistor, and each of the drive transistor 222 and the row selection transistor 223 may be an n-type metal oxide semiconductor (NMOS) transistor.

Figure 4:
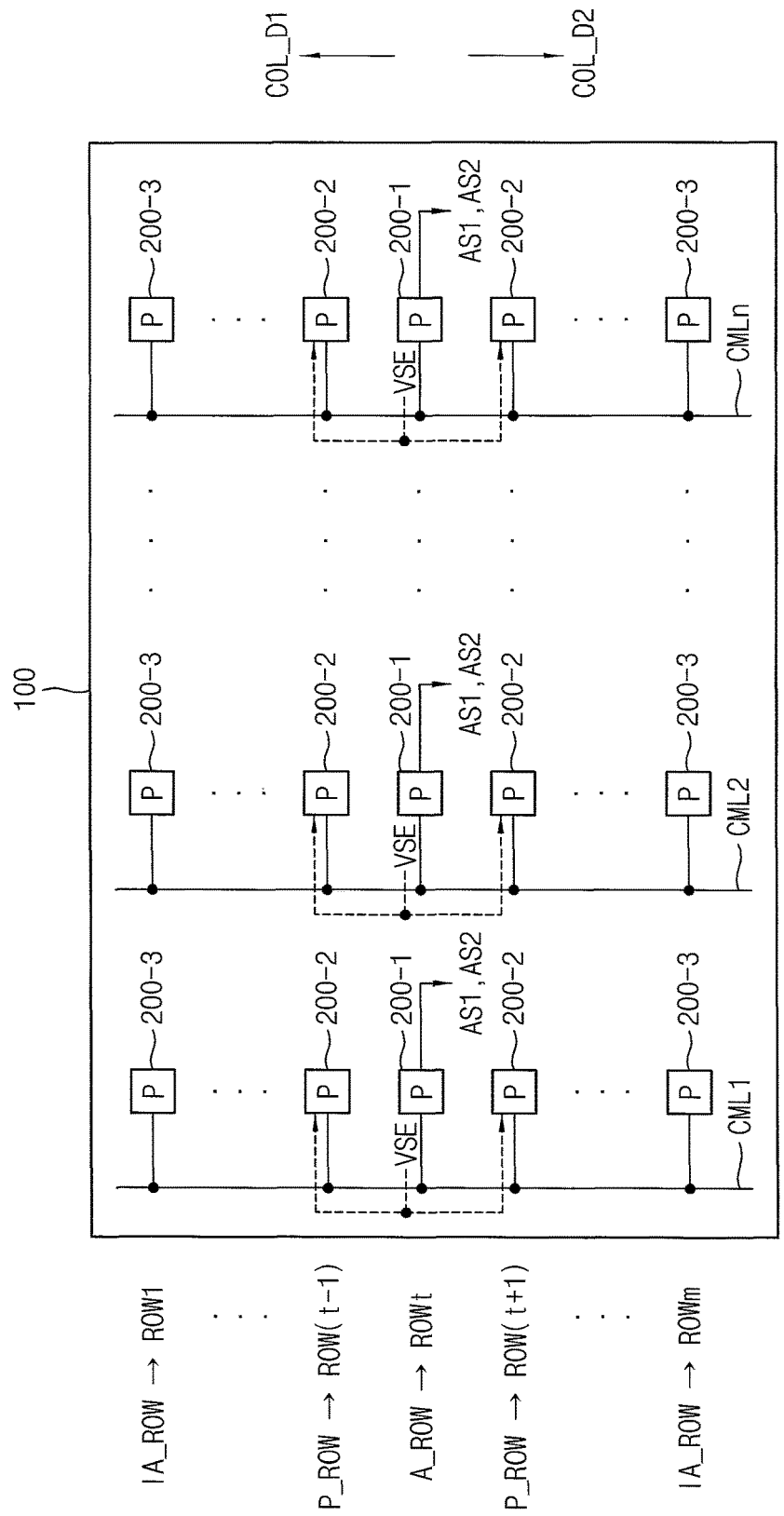
FIGS. 4 and 5 are diagrams for describing an operation of the fingerprint sensor of FIG. 1 when the fingerprint sensor of FIG. 1 includes the pixel array of FIG. 3.
Figure 5:
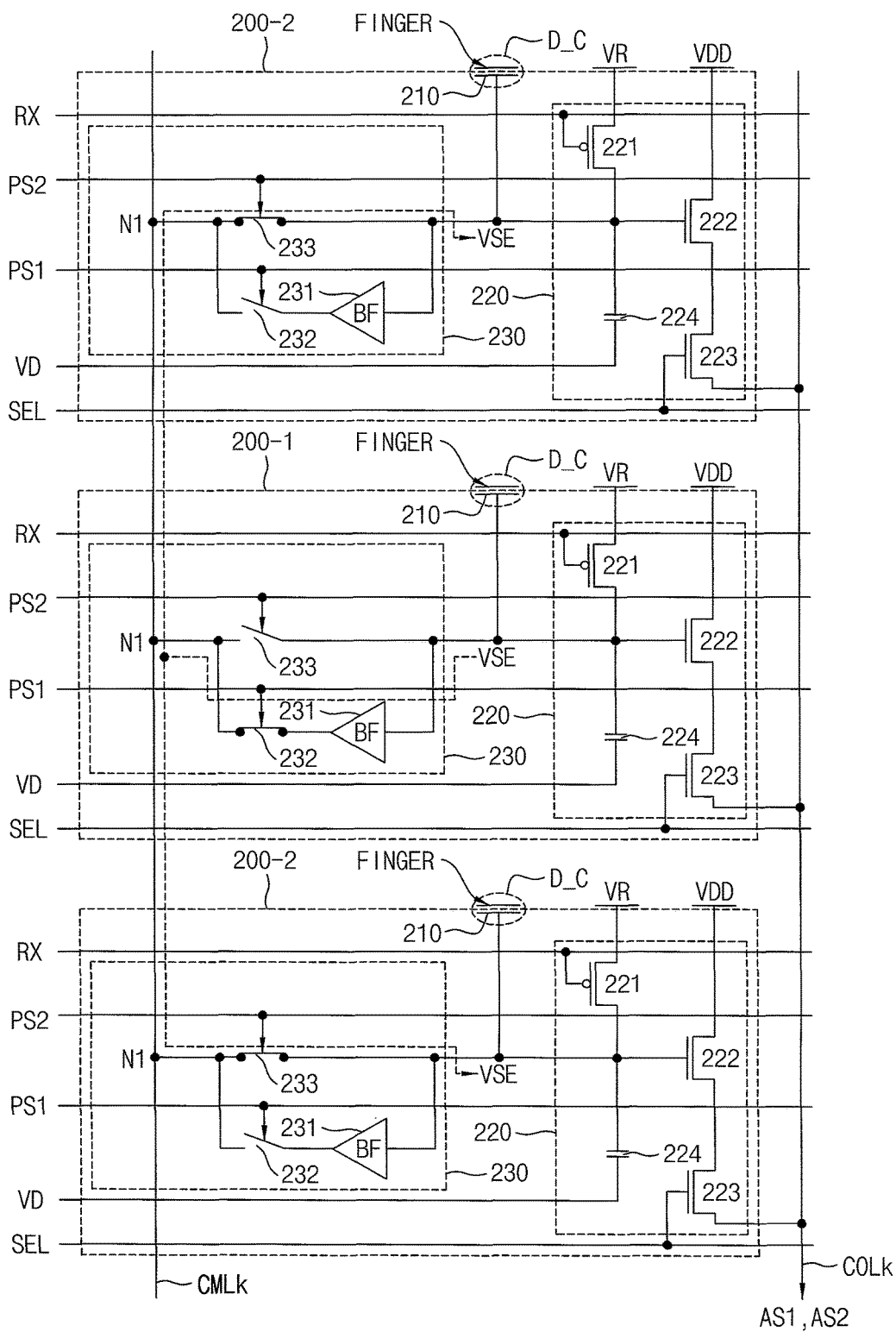

FIGS. 4 and 5 are diagrams for describing an operation of the fingerprint sensor of FIG. 1 when the fingerprint sensor of FIG. 1 includes the pixel array of FIG. 3.

In FIG. 4, the pixel array 100 is illustrated to include first through m-th rows ROW1~ROWm. Here, m represents a positive integer.

Hereafter, an operation of the fingerprint sensor 10 will be described with reference to FIGS. 1 to 5.

When a finger is on (e.g., contacting) the pixel array 100, the controller 300 may determine one of the first through m-th rows ROW1~ROWm included in the pixel array 100 as an active row A_ROW, and determine at least one row adjacent to the active row A_ROW as a protection row P_ROW.

In some example embodiments, as illustrated in FIG. 4, the controller 300 may determine the t-th row ROWt as the active row A_ROW, and determine one row ROW(t−1) adjacent to the active row A_ROW in a first column direction COL_D1 and one row ROW(t+1) adjacent to the active row A_ROW in a second column direction COL_D2 as the protection rows P_ROW. Here, t represents a positive integer equal to or smaller than m.

The controller 300 may provide the first protection signal PS1 in the activated state and the second protection signal PS2 in an inactivated state to the active unit pixel 200-1 included in the active row A_ROW. Therefore, as illustrated in FIG. 5, the first protection switch 232 included in the active unit pixel 200-1 of the active row A_ROW may be turned on in response to the first protection signal PS1 in the activated state, and the second protection switch 233 included in the active unit pixel 200-1 of the active row A_ROW may be turned off in response to the second protection signal PS2 in the inactivated state.

In addition, the controller 300 may provide the first protection signal PS1 in the inactivated state and the second protection signal PS2 in the activated state to the protection unit pixel 200-2 included in the protection row P_ROW. Therefore, as illustrated in FIG. 5, the first protection switch 232 included in the protection unit pixel 200-2 of the protection row P_ROW may be turned off in response to the first protection signal PS1 in the inactivated state, and the second protection switch 233 included in the protection unit pixel 200-2 of the protection row P_ROW may be turned on in response to the second protection signal PS2 in the activated state.

The controller 300 may provide the first protection signal PS1 in the inactivated state and the second protection signal PS2 in the inactivated state to an inactive unit pixel 200-3 included in inactive rows IA_ROW, which correspond to rows other than the active row A_ROW and the protection row P_ROW among the first through m-th rows ROW1~ROWm included in the pixel array 100. Therefore, the first protection switch 232 included in the inactive unit pixel 200-3 included in the inactive rows IA_ROW may be turned off in response to the first protection signal PS1 in the inactivated state, and the second protection switch 233 included in the inactive unit pixel 200-3 included in the inactive rows IA_ROW may be turned off in response to the second protection signal PS2 in the inactivated state.

Therefore, as illustrated in FIGS. 4 and 5, the detection voltage VSE formed at the sensing electrode 210 of the active unit pixel 200-1 may be transferred to the corresponding common line CMLk through the buffer 231 and the first protection switch 232 of the active unit pixel 200-1, and the detection voltage VSE transferred to the corresponding common line CMLk may be provided to the sensing electrode 210 of the protection unit pixel 200-2 through the second protection switch 233 of the protection unit pixel 200-2.

Since the second protection switch 233 included in the inactive unit pixel 200-3 is turned off, the detection voltage VSE transferred to the corresponding common line CMLk may not be provided to the sensing electrode 210 of the inactive unit pixel 200-3.

Therefore, while a sensing operation is performed on the active unit pixel 200-1 included in the active row A_ROW, the sensing electrode 210 of the protection unit pixel 200-2, which is adjacent to the active unit pixel 200-1 in the column direction, and the sensing electrode 210 included in the active unit pixel 200-1 may be maintained at substantially the same voltage.

Figure 6:
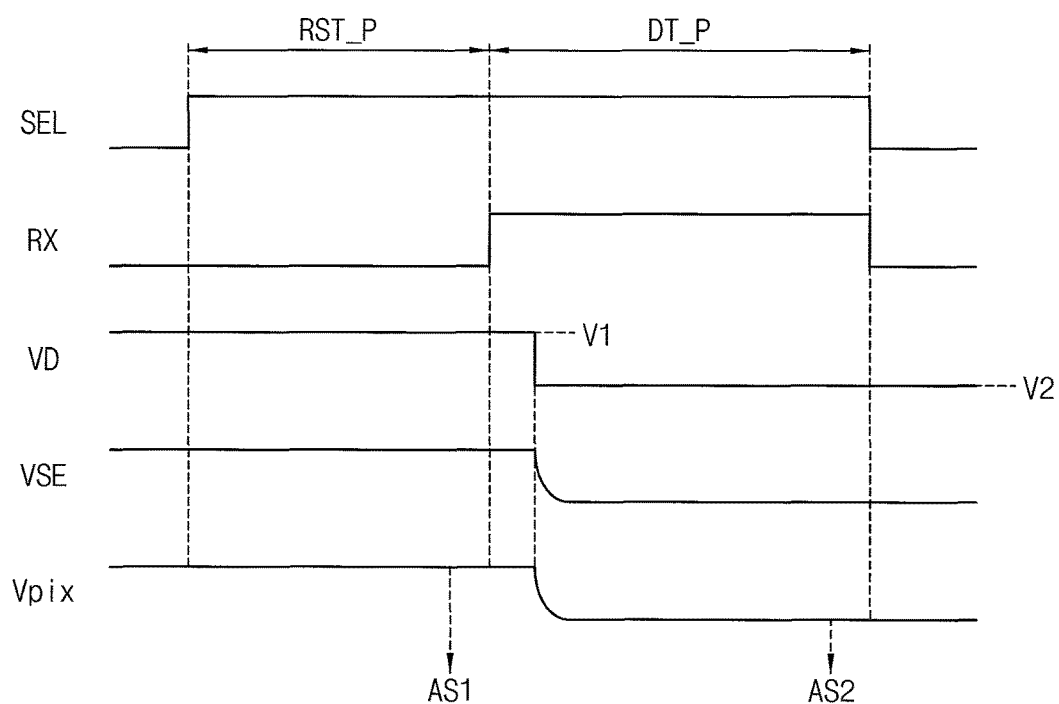
FIG. 6 is a timing diagram for describing an operation of a signal generation circuit included in each of a plurality of unit pixels of FIG. 3.

FIG. 6 is a timing diagram for describing an operation of a signal generation circuit included in each of a plurality of unit pixels of FIG. 3.

Referring to FIGS. 3 and 6, the controller 300 may provide the row selection signal SEL activated in a logic high level to the active unit pixel 200-1 included in the active row A_ROW. Therefore, the row selection transistor 223 included in the active unit pixel 200-1 may be turned on, such that the signal generation circuit 220 included in the active unit pixel 200-1 may be coupled to the corresponding column line COLk.

In addition, the controller 300 may provide the row selection signal SEL inactivated in a logic low level to the protection unit pixel 200-2 included in the protection row P_ROW and the inactive unit pixel 200-3 included in the inactive rows IA_ROW. Therefore, the row selection transistor 223 included in the protection unit pixel 200-2 and the inactive unit pixel 200-3 may be turned off, such that the signal generation circuit 220 included in the protection unit pixel 200-2 and the inactive unit pixel 200-3 may be disconnected from the corresponding column line COLk.

As illustrated in FIG. 6, the activated period of the row selection signal SEL may be divided into a reset period RST_P and a detection period DT_P.

Referring to FIG. 6, the controller 300 may provide the reset control signal RX activated in a logic low level to the active unit pixel 200-1 during the reset period RST_P. In addition, the controller 300 may provide the drive voltage VD having a first voltage level V1 to the active unit pixel 200-1 during the reset period RST_P.

Since the reset transistor 221 included in the active unit pixel 200-1 is turned on in response to the reset control signal RX activated in the logic low level, the detection voltage VSE formed at the sensing electrode 210 of the active unit pixel 200-1 may be reset to the reset voltage VR and charges corresponding to a voltage difference between the reset voltage VR and the drive voltage VD may be charged in the drive capacitor 224 during the reset period RST_P.

Since the gate of the drive transistor 222 receives the detection voltage VSE formed at the sensing electrode 210, the reset voltage VR may be provided to the gate of the drive transistor 222. Therefore, the signal generation circuit 220 included in the active unit pixel 200-1 may output a pixel signal Vpix corresponding to the reset voltage VR through the drive transistor 222 and the row selection transistor 223 as the first analog signal AS1 during the reset period RST_P.

After that, the controller 300 may provide the reset control signal RX inactivated in the logic high level to the active unit pixel 200-1 during the detection period DT_P. Since the reset transistor 221 included in the active unit pixel 200-1 is turned off in response to the reset control signal RX inactivated in the logic high level, the sensing electrode 210 of the active unit pixel 200-1 may be floated during the detection period DT_P.

After that, the controller 300 may provide the drive voltage VD having a second voltage level V2 lower than the first voltage level V1 to the active unit pixel 200-1. Therefore, as illustrated in FIG. 6, the detection voltage VSE formed at the sensing electrode 210 of the active unit pixel 200-1 may decrease based on a ratio of the capacitance of the detection capacitor D_C, which is formed by the sensing electrode 210 and the finger contacted on the pixel array 100, to the capacitance of the drive capacitor 224.

Since the gate of the drive transistor 222 receives the detection voltage VSE formed at the sensing electrode 210, the signal generation circuit 220 included in the active unit pixel 200-1 may output the pixel signal Vpix corresponding to a voltage level of the detection voltage VSE through the drive transistor 222 and the row selection transistor 223 as the second analog signal AS2 during the detection period DT_P.

As described above with reference to FIGS. 4 and 5, while a sensing operation is performed on the active unit pixel 200-1 included in the active row A_ROW, the sensing electrode 210 of the protection unit pixel 200-2, which is adjacent to the active unit pixel 200-1 in the column direction, and the sensing electrode 210 included in the active unit pixel 200-1 may be maintained at substantially the same voltage. Therefore, both electrodes of the parasitic capacitor P_C, which is formed by the sensing electrode 210 included in the active unit pixel 200-1 and the sensing electrode 210 included in the protection unit pixel 200-2, may be maintained at substantially the same voltage.

Therefore, the second analog signal AS2 output by the active unit pixel 200-1 may not include a noise element, which is caused by the parasitic capacitor P_C. As such, a sensing performance of the fingerprint sensor 10 may be effectively increased.

Figure 7:
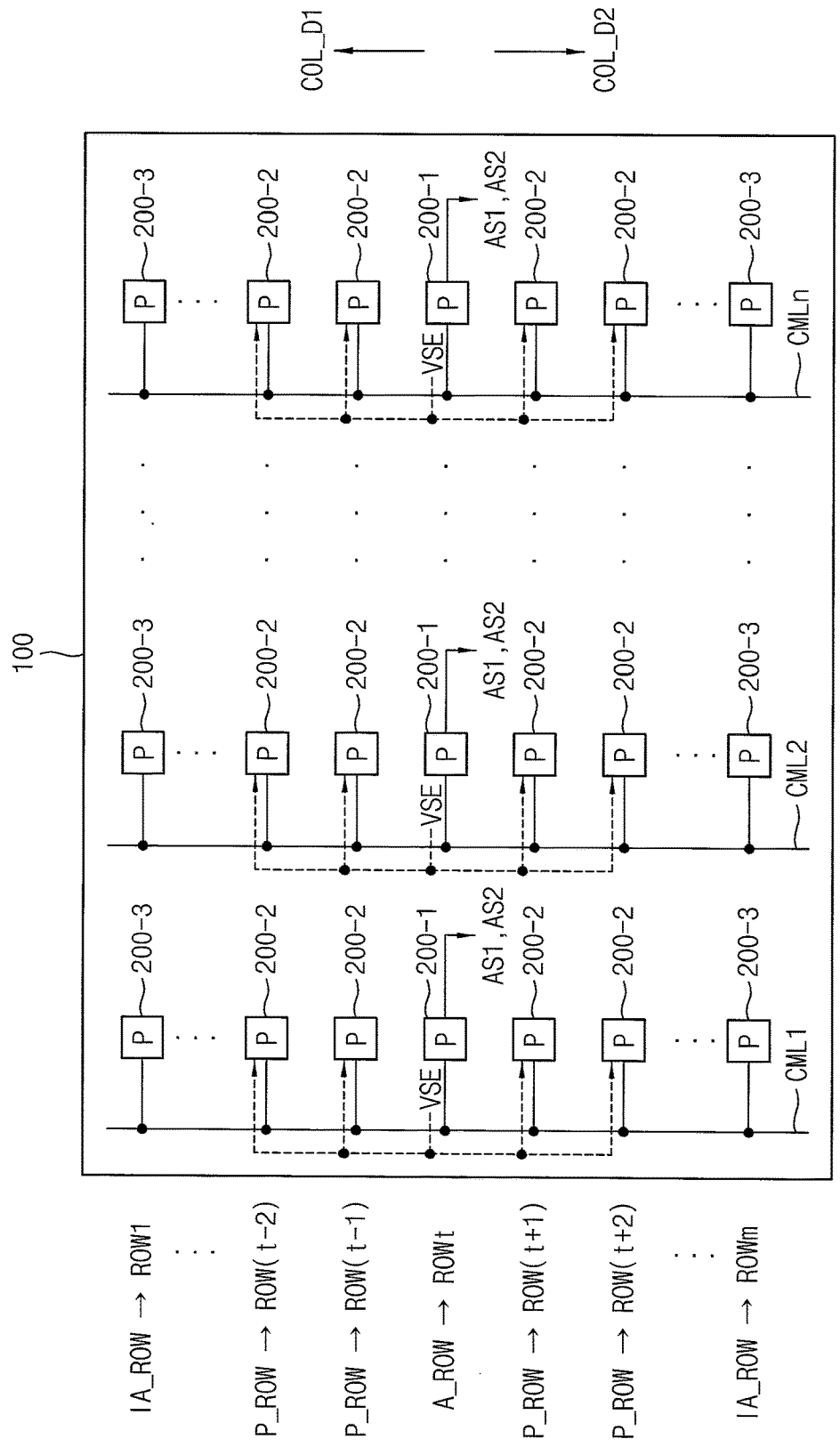
FIG. 7 is a diagram for describing an operation of the fingerprint sensor of FIG. 1 when the fingerprint sensor of FIG. 1 includes the pixel array of FIG. 3.

FIG. 7 is a diagram for describing an operation of the fingerprint sensor of FIG. 1 when the fingerprint sensor of FIG. 1 includes the pixel array of FIG. 3.

Hereafter, an operation of the fingerprint sensor 10 will be described with reference to FIGS. 1 to 3 and 7.

When a finger contacts the pixel array 100, the controller 300 may determine one of the first through m-th rows ROW1~ROWm included in the pixel array 100 as an active row A_ROW, and determine at least two rows adjacent to the active row A_ROW in the first column direction COL_D1 and at least two rows adjacent to the active row A_ROW in the second column direction COL_D2 as protection rows P_ROW.

In some example embodiments, as illustrated in FIG. 7, the controller 300 may determine the t-th row ROWt as the active row A_ROW, and determine two rows ROW(t−1) and ROW(t−2) adjacent to the active row A_ROW in the first column direction COL_D1 and two rows ROW(t+1) and ROW(t+2) adjacent to the active row A_ROW in the second column direction COL_D2 as the protection rows P_ROW.

The controller 300 may provide the first protection signal PS1 in the activated state and the second protection signal PS2 in the inactivated state to the active unit pixel 200-1 included in the active row A_ROW. Therefore, the first protection switch 232 included in the active unit pixel 200-1 included in the active row A_ROW may be turned on in response to the first protection signal PS1 in the activated state, and the second protection switch 233 included in the active unit pixel 200-1 included in the active row A_ROW may be turned off in response to the second protection signal PS2 in the inactivated state.

In addition, the controller 300 may provide the first protection signal PS1 in the inactivated state and the second protection signal PS2 in the activated state to the protection unit pixel 200-2 included in the protection row P_ROW. Therefore, the first protection switch 232 included in the protection unit pixel 200-2 included in the protection rows P_ROW may be turned off in response to the first protection signal PS1 in the inactivated state, and the second protection switch 233 included in the protection unit pixel 200-2 included in the protection row P_ROW may be turned on in response to the second protection signal PS2 in the activated state.

The controller 300 may provide the first protection signal PS1 in the inactivated state and the second protection signal PS2 in the inactivated state to an inactive unit pixel 200-3 included in inactive rows IA_ROW, which correspond to rows other than the active row A_ROW and the protection row P_ROW among the first through m-th rows ROW1~ROWm included in the pixel array 100. Therefore, the first protection switch 232 included in the inactive unit pixel 200-3 included in the inactive rows IA_ROW may be turned off in response to the first protection signal PS1 in the inactivated state, and the second protection switch 233 included in the inactive unit pixel 200-3 included in the inactive rows IA_ROW may be turned off in response to the second protection signal PS2 in the inactivated state.

Therefore, as illustrated in FIG. 7, the detection voltage VSE formed at the sensing electrode 210 of the active unit pixel 200-1 may be transferred to the corresponding common line CMLk through the buffer 231 and the first protection switch 232 of the active unit pixel 200-1, and the detection voltage VSE transferred to the corresponding common line CMLk may be provided to the sensing electrode 210 of the protection unit pixel 200-2 through the second protection switch 233 of the protection unit pixel 200-2.

Since the second protection switch 233 included in the inactive unit pixel 200-3 is turned off, the detection voltage VSE transferred to the corresponding common line CMLk may not be provided to the sensing electrode 210 of the inactive unit pixel 200-3.

Therefore, while a sensing operation is performed on the active unit pixel 200-1 included in the active row A_ROW, the sensing electrode 210 of the protection unit pixel 200-2, which is adjacent to the active unit pixel 200-1 in the column direction, and the sensing electrode 210 included in the active unit pixel 200-1 may be maintained at substantially the same voltage. Therefore, both electrodes of the parasitic capacitor P_C, which is formed by the sensing electrode 210 included in the active unit pixel 200-1 and the sensing electrode 210 included in the protection unit pixel 200-2, may be maintained at substantially the same voltage.

Therefore, as described above with reference to FIG. 6, the parasitic capacitor P_C, which is formed by the sensing electrode 210 included in the active unit pixel 200-1 and the sensing electrode 210 included in the protection unit pixel 200-2, may not affect the operation of the signal generation circuit 220 included in the active unit pixel 200-1 to generate the first analog signal AS1 and the second analog signal AS2 based on the detection voltage VSE formed at the sensing electrode 210.

Therefore, the second analog signal AS2 output by the active unit pixel 200-1 may not include a noise element, which is caused by the parasitic capacitor P_C. As such, a sensing performance of the fingerprint sensor 10 may be effectively increased.

Figure 8:
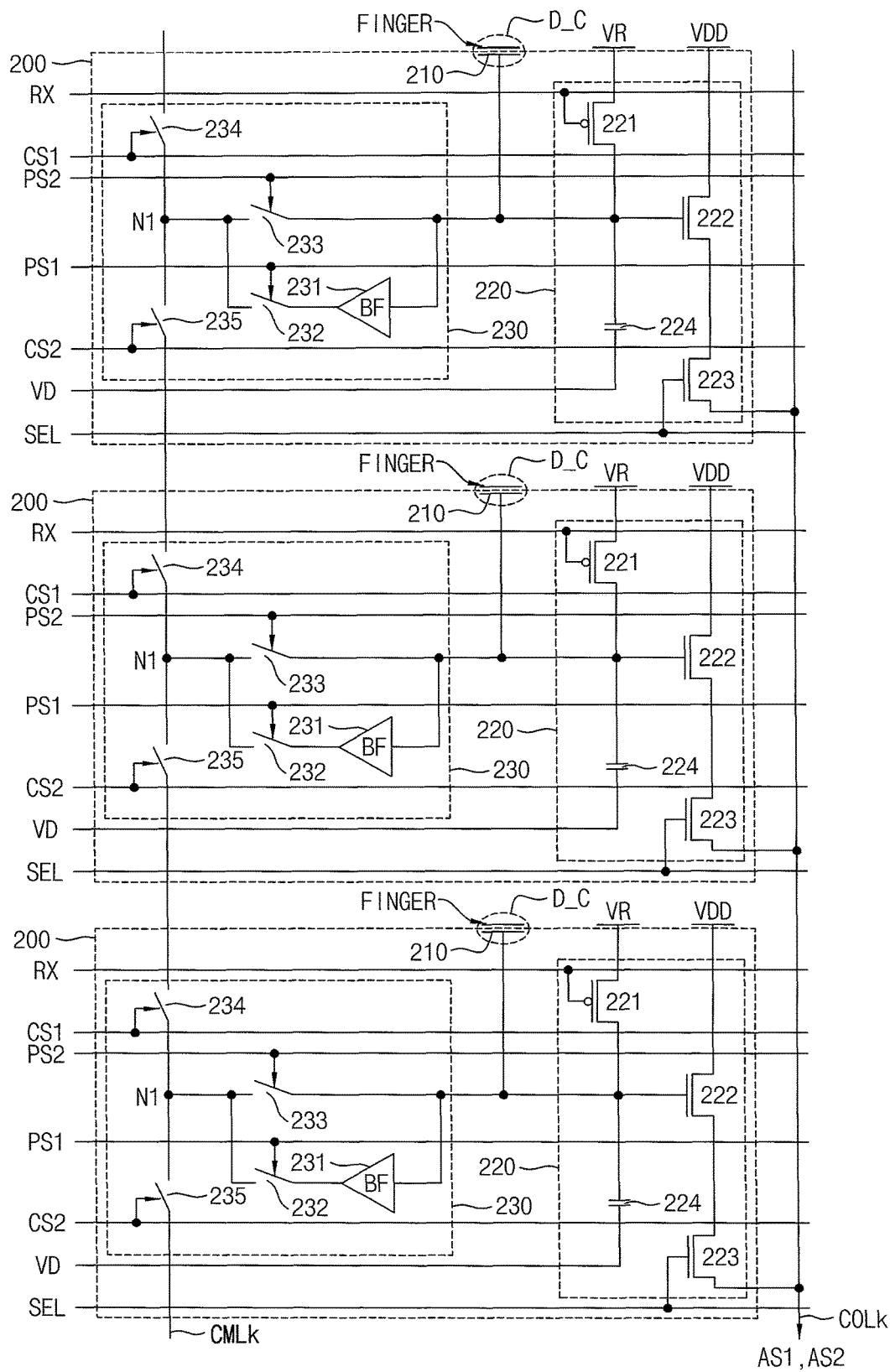
FIG. 8 is a circuit diagram illustrating an example of a pixel array included in the fingerprint sensor of FIG. 1.

FIG. 8 is a circuit diagram illustrating an example of a pixel array included in the fingerprint sensor of FIG. 1.

In FIG. 8, three unit pixels 200 that are adjacent to each other in the column direction are illustrated.

Referring to FIG. 8, each of the plurality of unit pixels 200 may include the sensing electrode 210, the signal generation circuit 220, and the protection circuit 230.

The unit pixel 200 of FIG. 8 is the same as the unit pixel 200 of FIG. 3 except that the protection circuit 230 included in the unit pixel 200 of FIG. 8 further includes a first connection switch 234 and a second connection switch 235.

Therefore, duplicated descriptions will be omitted, and connections and operations of the first connection switch 234 and the second connection switch 235 will be described.

The first connection switch 234 may be formed on the corresponding common line CMLk in the first column direction COL_D1 from the first node N1. The first connection switch 234 may be turned on in response to a first connection signal CS1 provided by the controller 300. When the first connection switch 234 is turned on, the first connection switch 234 may prolong the corresponding common line CMLk in the first column direction COL_D1. That is, the first connection switch 234 may selectively connect the corresponding common line CMLk between the corresponding unit pixel 200 and the unit pixel 200 adjacent to the corresponding unit pixel 200 in the first column direction COL_D1 based on the first connection signal CS1.

The second connection switch 235 may be formed on the corresponding common line CMLk in the second column direction COL_D2 from the first node N1. The second connection switch 235 may be turned on in response to a second connection signal CS2 provided by the controller 300. When the second connection switch 235 is turned on, the second connection switch 235 may prolong the corresponding common line CMLk in the second column direction COL_D2. That is, the second connection switch 235 may selectively connect the corresponding common line CMLk between the corresponding unit pixel 200 and the unit pixel 200 adjacent to the corresponding unit pixel 200 in the second column direction COL_D2 based on the second connection signal CS2.

Figure 9:
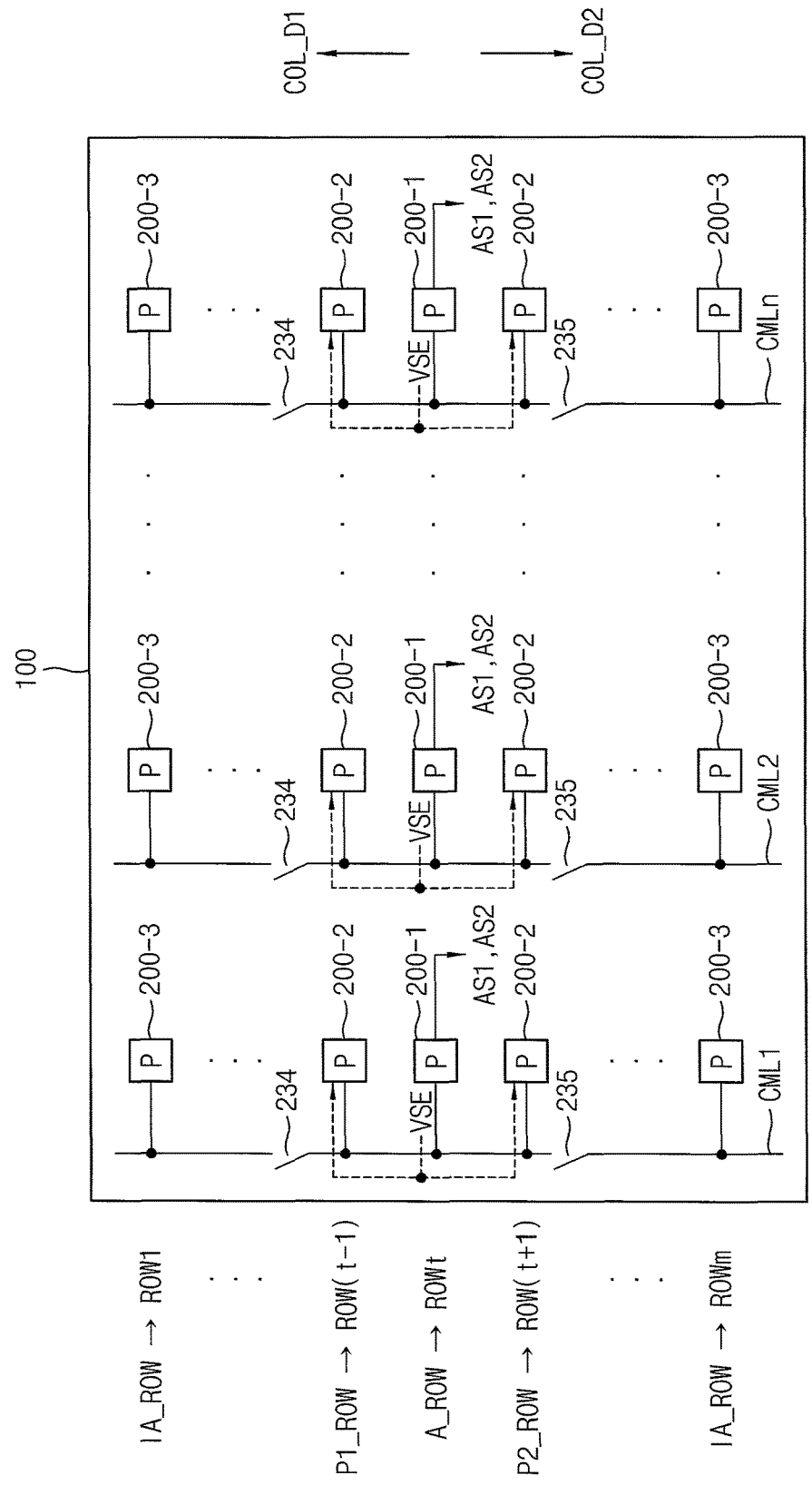
FIGS. 9 and 10 are diagrams for describing an operation of the fingerprint sensor of FIG. 1 when the fingerprint sensor of FIG. 1 includes the pixel array of FIG. 8.
Figure 10:
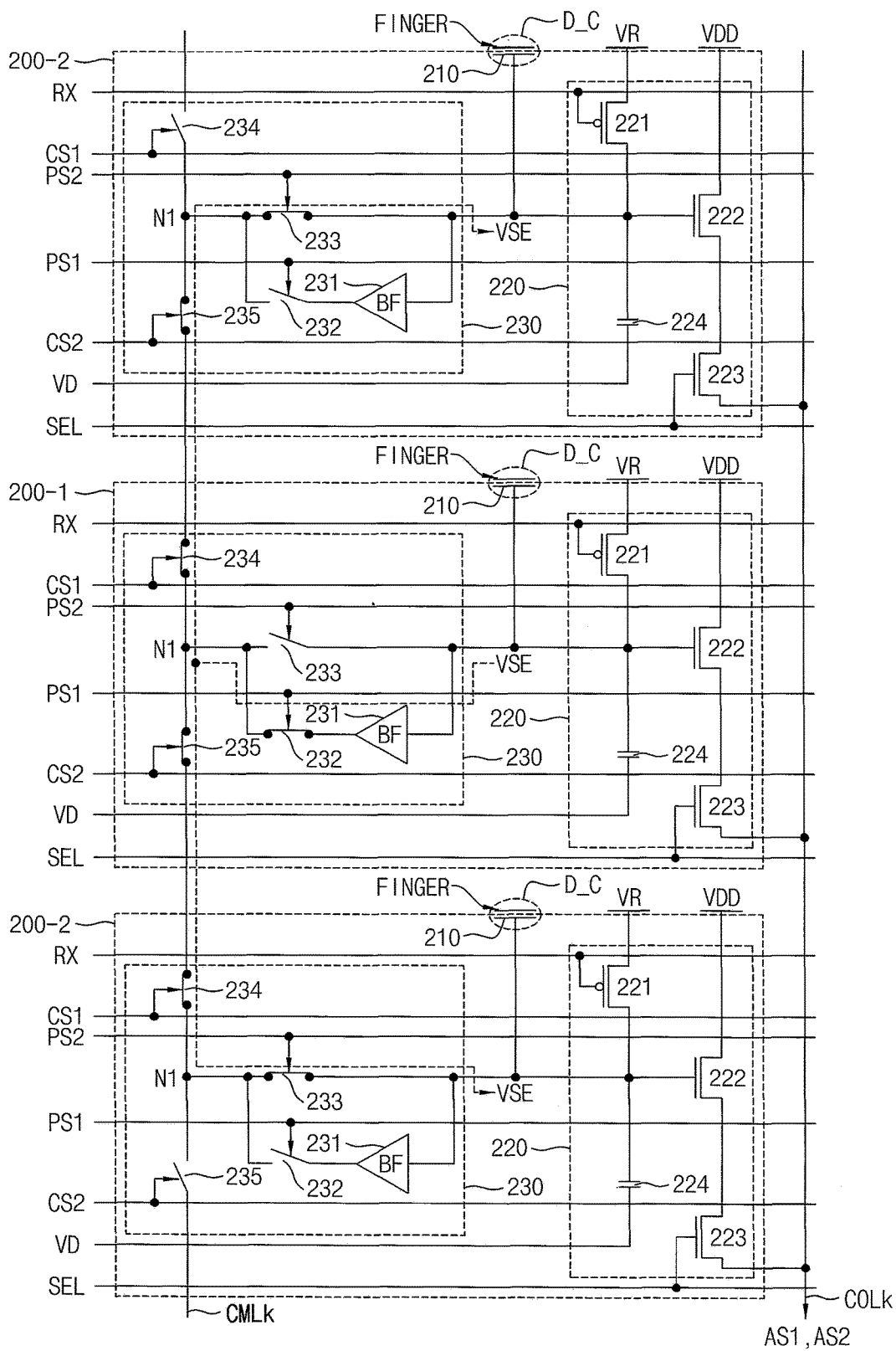

FIGS. 9 and 10 are diagrams for describing an operation of the fingerprint sensor of FIG. 1 when the fingerprint sensor of FIG. 1 includes the pixel array of FIG. 8.

In FIG. 9, the pixel array 100 is illustrated to include first through m-th rows ROW1~ROWm.

Hereafter, an operation of the fingerprint sensor 10 will be described with reference to FIGS. 1, 2, and 8 to 10.

When a finger contacts the pixel array 100, the controller 300 may determine one of the first through m-th rows ROW1~ROWm included in the pixel array 100 as an active row A_ROW, and determine at least one row adjacent to the active row A_ROW as a protection row P_ROW.

In some example embodiments, as illustrated in FIG. 9, the controller 300 may determine the t-th row ROWt as the active row A_ROW, determine one row ROW(t−1) adjacent to the active row A_ROW in the first column direction COL_D1 as a first protection row P1_ROW, and determine one row ROW(t+1) adjacent to the active row A_ROW in the second column direction COL_D2 as a second protection rows P2_ROW.

The controller 300 may provide the first protection signal PS1 in the activated state, the second protection signal PS2 in the inactivated state, the first connection signal CS1 in the activated state, and the second connection signal CS2 in the activated state to the active unit pixel 200-1 included in the active row A_ROW. Therefore, as illustrated in FIG. 10, the first protection switch 232 included in the active unit pixel 200-1 of the active row A_ROW may be turned on in response to the first protection signal PS1 in the activated state, the second protection switch 233 included in the active unit pixel 200-1 of the active row A_ROW may be turned off in response to the second protection signal PS2 in the inactivated state, the first connection switch 234 included in the active unit pixel 200-1 of the active row A_ROW may be turned on in response to the first connection signal CS1 in the activated state, and the second connection switch 235 included in the active unit pixel 200-1 of the active row A_ROW may be turned on in response to the second connection signal CS2 in the activated state.

In addition, the controller 300 may provide the first protection signal PS1 in the inactivated state, the second protection signal PS2 in the activated state, the first connection signal CS1 in the inactivated state, and the second connection signal CS2 in the activated state to the protection unit pixel 200-2 included in the first protection row P1_ROW. Therefore, as illustrated in FIG. 10, the first protection switch 232 included in the protection unit pixel 200-2 of the first protection row P1_ROW may be turned off in response to the first protection signal PS1 in the inactivated state, the second protection switch 233 included in the protection unit pixel 200-2 of the first protection row P1_ROW may be turned on in response to the second protection signal PS2 in the activated state, the first connection switch 234 included in the protection unit pixel 200-2 of the first protection row P1_ROW may be turned off in response to the first connection signal CS1 in the inactivated state, and the second connection switch 235 included in the protection unit pixel 200-2 of the first protection row P1_ROW may be turned on in response to the second connection signal CS2 in the activated state.

In addition, the controller 300 may provide the first protection signal PS1 in the inactivated state, the second protection signal PS2 in the activated state, the first connection signal CS1 in the activated state, and the second connection signal CS2 in the inactivated state to the protection unit pixel 200-2 included in the second protection row P2_ROW. Therefore, as illustrated in FIG. 10, the first protection switch 232 included in the protection unit pixel 200-2 of the second protection row P2_ROW may be turned off in response to the first protection signal PS1 in the inactivated state, the second protection switch 233 included in the protection unit pixel 200-2 of the second protection row P2_ROW may be turned on in response to the second protection signal PS2 in the activated state, the first connection switch 234 included in the protection unit pixel 200-2 of the second protection row P2_ROW may be turned on in response to the first connection signal CS1 in the activated state, and the second connection switch 235 included in the protection unit pixel 200-2 of the second protection row P2_ROW may be turned off in response to the second connection signal CS2 in the inactivated state.

Therefore, as illustrated in FIGS. 9 and 10, the detection voltage VSE formed at the sensing electrode 210 of the active unit pixel 200-1 may be transferred to the corresponding common line CMLk through the buffer 231 and the first protection switch 232 of the active unit pixel 200-1. The detection voltage VSE of the active unit pixel 200-1 transferred to the corresponding common line CMLk may be provided to the sensing electrode 210 included in the protection unit pixel 200-2 of the first protection row P1_ROW through the first connection switch 234 included in the active unit pixel 200-1, the second connection switch 235 included in the protection unit pixel 200-2 of the first protection row P1_ROW, and the second protection switch 233 included in the protection unit pixel 200-2 of the first protection row P1_ROW. Similarly, the detection voltage VSE of the active unit pixel 200-1 transferred to the corresponding common line CMLk may be provided to the sensing electrode 210 included in the protection unit pixel 200-2 of the second protection row P2_ROW through the second connection switch 235 included in the active unit pixel 200-1, the first connection switch 234 included in the protection unit pixel 200-2 of the second protection row P2_ROW, and the second protection switch 233 included in the protection unit pixel 200-2 of the second protection row P2_ROW.

Since the first connection switch 234 included in the protection unit pixel 200-2 of the first protection row P1_ROW is turned off, the detection voltage VSE of the active unit pixel 200-1 transferred to the corresponding common line CMLk may not be provided to the sensing electrode 210 included in the inactive unit pixel 200-3 of the inactive rows IA_ROW located in the first column direction COL_D1 from the first protection row P1_ROW.

In addition, since the second connection switch 235 included in the protection unit pixel 200-2 of the second protection row P2_ROW is turned off, the detection voltage VSE of the active unit pixel 200-1 transferred to the corresponding common line CMLk may not be provided to the sensing electrode 210 included in the inactive unit pixel 200-3 of the inactive rows IA_ROW located in the second column direction COL_D2 from the second protection row P2_ROW.

Since the plurality of common lines CML1, CML2, . . . , CMLn are formed through the plurality of unit pixels 200, various parasitic capacitors may be formed on the plurality of common lines CML1, CML2, . . . , CMLn.

As illustrated in FIG. 3, when the protection circuit 230 does not include the first connection switch 234 and the second connection switch 235, the detection voltage VSE formed at the sensing electrode 210 of the active unit pixel 200-1 may be transferred to all portion of the corresponding common line CMLk. Therefore, a magnitude of a voltage provided to the sensing electrode 210 of the protection unit pixel 200-2 through the corresponding common line CMLk may be lower than a magnitude of the detection voltage VSE formed at the sensing electrode 210 of the active unit pixel 200-1.

On the other hand, as illustrated in FIG. 8, when the protection circuit 230 includes the first connection switch 234 and the second connection switch 235, the corresponding common line CMLk may be disconnected between the protection unit pixel 200-2 and the inactive unit pixel 200-3 by the first connection switch 234 and the second connection switch 235.

Therefore, the detection voltage VSE formed at the sensing electrode 210 of the active unit pixel 200-1 may be transferred to only a portion of the corresponding common line CMLk connecting the active unit pixel 200-1 and the protection unit pixel 200-2. Therefore, a magnitude of a voltage provided to the sensing electrode 210 of the protection unit pixel 200-2 through the corresponding common line CMLk may be substantially the same as a magnitude of the detection voltage VSE formed at the sensing electrode 210 of the active unit pixel 200-1.

As such, while a sensing operation is performed on the active unit pixel 200-1 included in the active row A_ROW, the sensing electrode 210 of the protection unit pixel 200-2, which is adjacent to the active unit pixel 200-1 in the column direction, and the sensing electrode 210 included in the active unit pixel 200-1 may be maintained at substantially the same voltage. Therefore, both electrodes of the parasitic capacitor P_C, which is formed by the sensing electrode 210 included in the active unit pixel 200-1 and the sensing electrode 210 included in the protection unit pixel 200-2, may be maintained at substantially the same voltage.

Therefore, as described above with reference to FIG. 6, the parasitic capacitor P_C, which is formed by the sensing electrode 210 included in the active unit pixel 200-1 and the sensing electrode 210 included in the protection unit pixel 200-2, may not affect the operation of the signal generation circuit 220 included in the active unit pixel 200-1 to generate the first analog signal AS1 and the second analog signal AS2 based on the detection voltage VSE formed at the sensing electrode 210.

Therefore, the second analog signal AS2 output by the active unit pixel 200-1 may not include a noise element, which is caused by the parasitic capacitor P_C. As such, a sensing performance of the fingerprint sensor 10 may be effectively increased.

Figure 11:
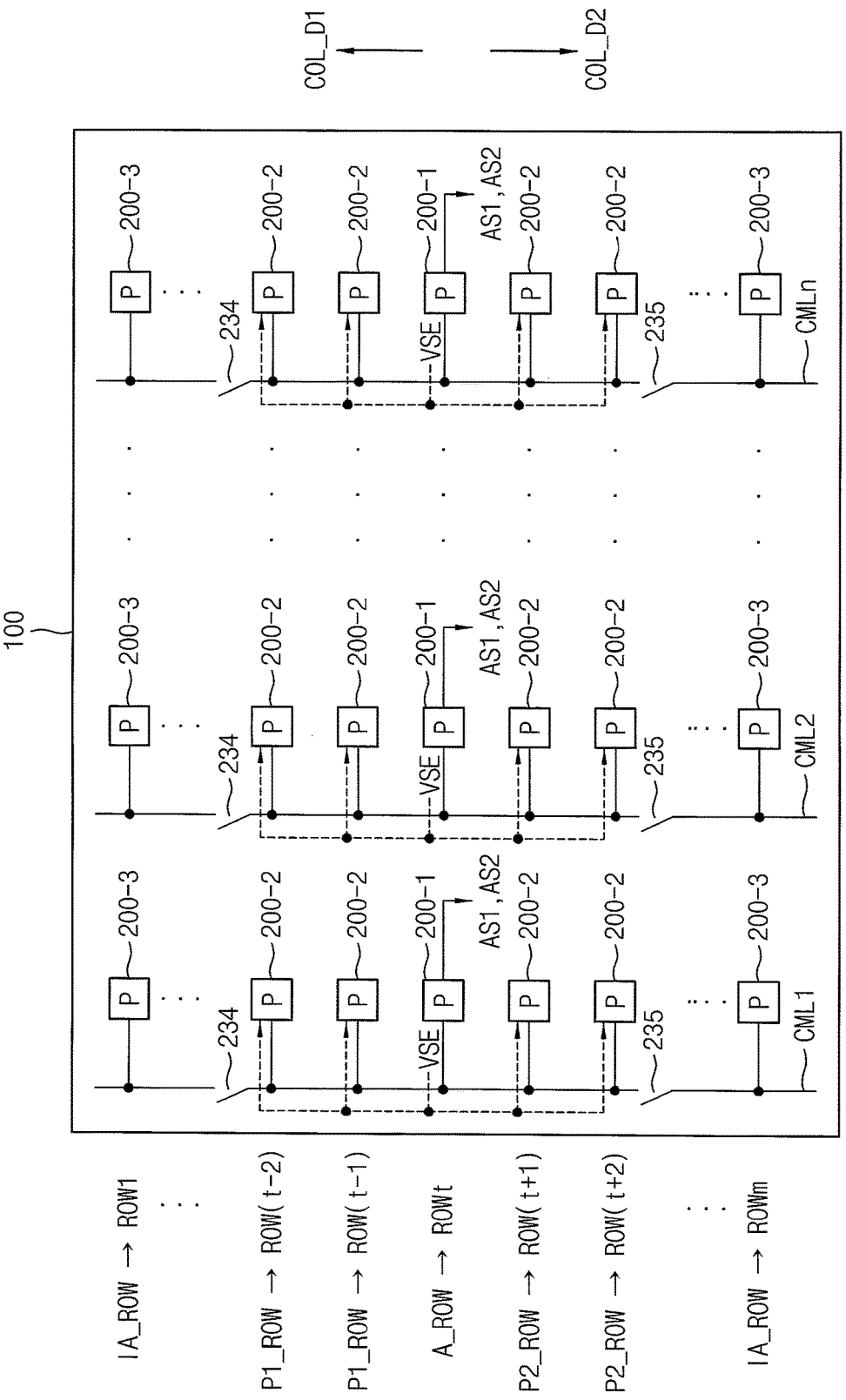
FIG. 11 is a diagram for describing an operation of the fingerprint sensor of FIG. 1 when the fingerprint sensor of FIG. 1 includes the pixel array of FIG. 8.

FIG. 11 is a diagram for describing an operation of the fingerprint sensor of FIG. 1 when the fingerprint sensor of FIG. 1 includes the pixel array of FIG. 8.

Hereafter, an operation of the fingerprint sensor 10 will be described with reference to FIGS. 1, 2, 8 and 11.

When a finger contacts the pixel array 100, the controller 300 may determine one of the first through m-th rows ROW1~ROWm included in the pixel array 100 as an active row A_ROW, and determine at least two rows adjacent to the active row A_ROW in the first column direction COL_D1 and at least two rows adjacent to the active row A_ROW in the second column direction COL_D2 as protection rows P_ROW.

In some example embodiments, as illustrated in FIG. 11, the controller 300 may determine the t-th row ROWt as the active row A_ROW, determine two rows ROW(t−1) and ROW(t−2) adjacent to the active row A_ROW in the first column direction COL_D1 as first protection rows P1_ROW, and determine two rows ROW(t+1) and ROW(t+2) adjacent to the active row A_ROW in the second column direction COL_D2 as second protection rows P2_ROW.

The controller 300 may provide the first protection signal PS1 in the activated state, the second protection signal PS2 in the inactivated state, the first connection signal CS1 in the activated state, and the second connection signal CS2 in the activated state to the active unit pixel 200-1 included in the active row A_ROW. Therefore, the first protection switch 232 included in the active unit pixel 200-1 of the active row A_ROW may be turned on in response to the first protection signal PS1 in the activated state, the second protection switch 233 included in the active unit pixel 200-1 of the active row A_ROW may be turned off in response to the second protection signal PS2 in the inactivated state, the first connection switch 234 included in the active unit pixel 200-1 of the active row A_ROW may be turned on in response to the first connection signal CS1 in the activated state, and the second connection switch 235 included in the active unit pixel 200-1 of the active row A_ROW may be turned on in response to the second connection signal CS2 in the activated state.

In addition, the controller 300 may provide the first protection signal PS1 in the inactivated state, the second protection signal PS2 in the activated state, the first connection signal CS1 in the inactivated state, and the second connection signal CS2 in the activated state to the protection unit pixel 200-2 included in a first last protection row, which corresponds to a last row in the first column direction COL_D1 among the first protection rows P1_ROW. Therefore, the first protection switch 232 included in the protection unit pixel 200-2 of the first last protection row may be turned off in response to the first protection signal PS1 in the inactivated state, the second protection switch 233 included in the protection unit pixel 200-2 of the first last protection row may be turned on in response to the second protection signal PS2 in the activated state, the first connection switch 234 included in the protection unit pixel 200-2 of the first last protection row may be turned off in response to the first connection signal CS1 in the inactivated state, and the second connection switch 235 included in the protection unit pixel 200-2 of the first last protection row may be turned on in response to the second connection signal CS2 in the activated state.

In addition, the controller 300 may provide the first protection signal PS1 in the inactivated state, the second protection signal PS2 in the activated state, the first connection signal CS1 in the activated state, and the second connection signal CS2 in the activated state to the protection unit pixel 200-2 included in the rest of the first protection rows P1_ROW except for the first last protection row. Therefore, the first protection switch 232 included in the protection unit pixel 200-2 of the rest of the first protection rows P1_ROW may be turned off in response to the first protection signal PS1 in the inactivated state, the second protection switch 233 included in the protection unit pixel 200-2 of the rest of the first protection rows P1_ROW may be turned on in response to the second protection signal PS2 in the activated state, the first connection switch 234 included in the protection unit pixel 200-2 of the rest of the first protection rows P1_ROW may be turned on in response to the first connection signal CS1 in the activated state, and the second connection switch 235 included in the protection unit pixel 200-2 of the rest of the first protection rows P1_ROW may be turned on in response to the second connection signal CS2 in the activated state.

In addition, the controller 300 may provide the first protection signal PS1 in the inactivated state, the second protection signal PS2 in the activated state, the first connection signal CS1 in the activated state, and the second connection signal CS2 in the inactivated state to the protection unit pixel 200-2 included in a second last protection row, which corresponds to a last row in the second column direction COL_D2 among the second protection rows P2_ROW. Therefore, the first protection switch 232 included in the protection unit pixel 200-2 of the second last protection row may be turned off in response to the first protection signal PS1 in the inactivated state, the second protection switch 233 included in the protection unit pixel 200-2 of the second last protection row may be turned on in response to the second protection signal PS2 in the activated state, the first connection switch 234 included in the protection unit pixel 200-2 of the second last protection row may be turned on in response to the first connection signal CS1 in the activated state, and the second connection switch 235 included in the protection unit pixel 200-2 of the second last protection row may be turned off in response to the second connection signal CS2 in the inactivated state.

In addition, the controller 300 may provide the first protection signal PS1 in the inactivated state, the second protection signal PS2 in the activated state, the first connection signal CS1 in the activated state, and the second connection signal CS2 in the activated state to the protection unit pixel 200-2 included in the rest of the second protection rows P2_ROW except for the second last protection row. Therefore, the first protection switch 232 included in the protection unit pixel 200-2 of the rest of the second protection rows P2_ROW may be turned off in response to the first protection signal PS1 in the inactivated state, the second protection switch 233 included in the protection unit pixel 200-2 of the rest of the second protection rows P2_ROW may be turned on in response to the second protection signal PS2 in the activated state, the first connection switch 234 included in the protection unit pixel 200-2 of the rest of the second protection rows P2_ROW may be turned on in response to the first connection signal CS1 in the activated state, and the second connection switch 235 included in the protection unit pixel 200-2 of the rest of the second protection rows P2_ROW may be turned on in response to the second connection signal CS2 in the activated state.

Therefore, as illustrated in FIG. 11, the detection voltage VSE formed at the sensing electrode 210 of the active unit pixel 200-1 may be transferred to the corresponding common line CMLk through the buffer 231 and the first protection switch 232 of the active unit pixel 200-1. The detection voltage VSE of the active unit pixel 200-1 transferred to the corresponding common line CMLk may be provided to the sensing electrode 210 included in the protection unit pixel 200-2 of the first protection rows P1_ROW through the first connection switch 234 included in the active unit pixel 200-1, and the first connection switch 234, the second connection switch 235, and the second protection switch 233 included in the protection unit pixel 200-2 of the first protection rows P1_ROW. Similarly, the detection voltage VSE of the active unit pixel 200-1 transferred to the corresponding common line CMLk may be provided to the sensing electrode 210 included in the protection unit pixel 200-2 of the second protection rows P2_ROW through the second connection switch 235 included in the active unit pixel 200-1, and the first connection switch 234, the second connection switch 235, and the second protection switch 233 included in the protection unit pixel 200-2 of the second protection rows P2_ROW.

Since the first connection switch 234 included in the protection unit pixel 200-2 of the first last protection row is turned off, the detection voltage VSE of the active unit pixel 200-1 transferred to the corresponding common line CMLk may not be provided to the sensing electrode 210 included in the inactive unit pixel 200-3 of the inactive rows IA_ROW located in the first column direction COL_D1 from the first last protection row.

In addition, since the second connection switch 235 included in the protection unit pixel 200-2 of the second last protection row is turned off, the detection voltage VSE of the active unit pixel 200-1 transferred to the corresponding common line CMLk may not be provided to the sensing electrode 210 included in the inactive unit pixel 200-3 of the inactive rows IA_ROW located in the second column direction COL_D2 from the second last protection row.

Therefore, the detection voltage VSE formed at the sensing electrode 210 of the active unit pixel 200-1 may be transferred to only a portion of the corresponding common line CMLk connecting the active unit pixel 200-1 and the protection unit pixel 200-2. Therefore, a magnitude of a voltage provided to the sensing electrode 210 of the protection unit pixel 200-2 through the corresponding common line CMLk may be substantially the same as a magnitude of the detection voltage VSE formed at the sensing electrode 210 of the active unit pixel 200-1.

As such, while a sensing operation is performed on the active unit pixel 200-1 included in the active row A_ROW, the sensing electrode 210 of the protection unit pixel 200-2, which is adjacent to the active unit pixel 200-1 in the column direction, and the sensing electrode 210 included in the active unit pixel 200-1 may be maintained at substantially the same voltage. Therefore, both electrodes of the parasitic capacitor P_C, which is formed by the sensing electrode 210 included in the active unit pixel 200-1 and the sensing electrode 210 included in the protection unit pixel 200-2, may be maintained at substantially the same voltage.

Therefore, as described above with reference to FIG. 6, the parasitic capacitor P_C, which is formed by the sensing electrode 210 included in the active unit pixel 200-1 and the sensing electrode 210 included in the protection unit pixel 200-2, may not affect the operation of the signal generation circuit 220 included in the active unit pixel 200-1 to generate the first analog signal AS1 and the second analog signal AS2 based on the detection voltage VSE formed at the sensing electrode 210.

Therefore, the second analog signal AS2 output by the active unit pixel 200-1 may not include a noise element, which is caused by the parasitic capacitor P_C. As such, a sensing performance of the fingerprint sensor 10 may be effectively increased.

Although it is described above with reference to FIGS. 8 to 11 that the controller 300 provides the first protection signal PS1, the second protection signal PS2, the first connection signal CS1, and the second connection signal CS2 to each of the plurality of unit pixels 200, example embodiments are not limited thereto. According to example embodiments, the controller 300 may provide only the first protection signal PS1, the first connection signal CS1, and the second connection signal CS2 to each of the plurality of unit pixels 200, and each of the plurality of unit pixels 200 may internally generate the second protection signal PS2 by inverting the first protection signal PS1.

Although it is described above with reference to FIGS. 1 to 11 that the fingerprint sensor 10 includes the signal generation circuit 220 of FIG. 3 or the signal generation circuit 220 of FIG. 8, example embodiments are not limited thereto. According to example embodiments, the signal generation circuit 220 may be implemented with various structures.

Referring again to FIG. 1, the analog-to-digital converter 400 may perform an analog-to-digital conversion operation on the first analog signal AS1 and the second analog signal AS2, which are provided by the pixel array 100 row by row, based on control signals CONs received from the controller 300 to generate a digital signal DS.

Therefore, the digital signal DS may represent a fingerprint pattern of the finger contacted on the pixel array 100.

In a general fingerprint sensor, since a parasitic capacitor is formed between the sensing electrodes included in the plurality of unit pixels, a sensing performance of the general fingerprint sensor is decreased due to a noise element caused by the parasitic capacitor.

On the other hand, as described above with reference to FIGS. 1 to 11, each of the plurality of unit pixels 200 included in the fingerprint sensor 10 according to example embodiments may include the protection circuit 230 which controls a voltage transfer between the corresponding sensing electrode 210 and the corresponding common line CMLk under a control of the controller 300.

Therefore, in the operation of the fingerprint sensor 10, when the finger contacts the pixel array 100, the controller 300 may control the protection circuit 230 included in each of the plurality of unit pixels 200 to transfer the detection voltage VSE formed at the sensing electrode 210 included in the active unit pixel 200-1, on which a sensing operation is performed, among the plurality of unit pixels 200 to the sensing electrode 210 included in the at least one protection unit pixel 200-2, which is adjacent to the active unit pixel 200-1, among the plurality of unit pixels 200 through the corresponding common line CMLk.

Therefore, the sensing electrode 210 included in the at least one protection unit pixel 200-2, which is adjacent to the active unit pixel 200-1, and the sensing electrode 210 included in the active unit pixel 200-1 may be maintained at substantially the same voltage.

Since both electrodes of the parasitic capacitor P_C, which correspond to the sensing electrode 210 included in the active unit pixel 200-1 and the sensing electrode 210 included in the at least one protection unit pixel 200-2, are maintained at substantially the same voltage, an effect of the parasitic capacitor P_C on the sensing operation for the active unit pixel 200-1 may be eliminated or reduced. Therefore, a sensing performance of the fingerprint sensor 10 may be effectively increased.

Figure 12:
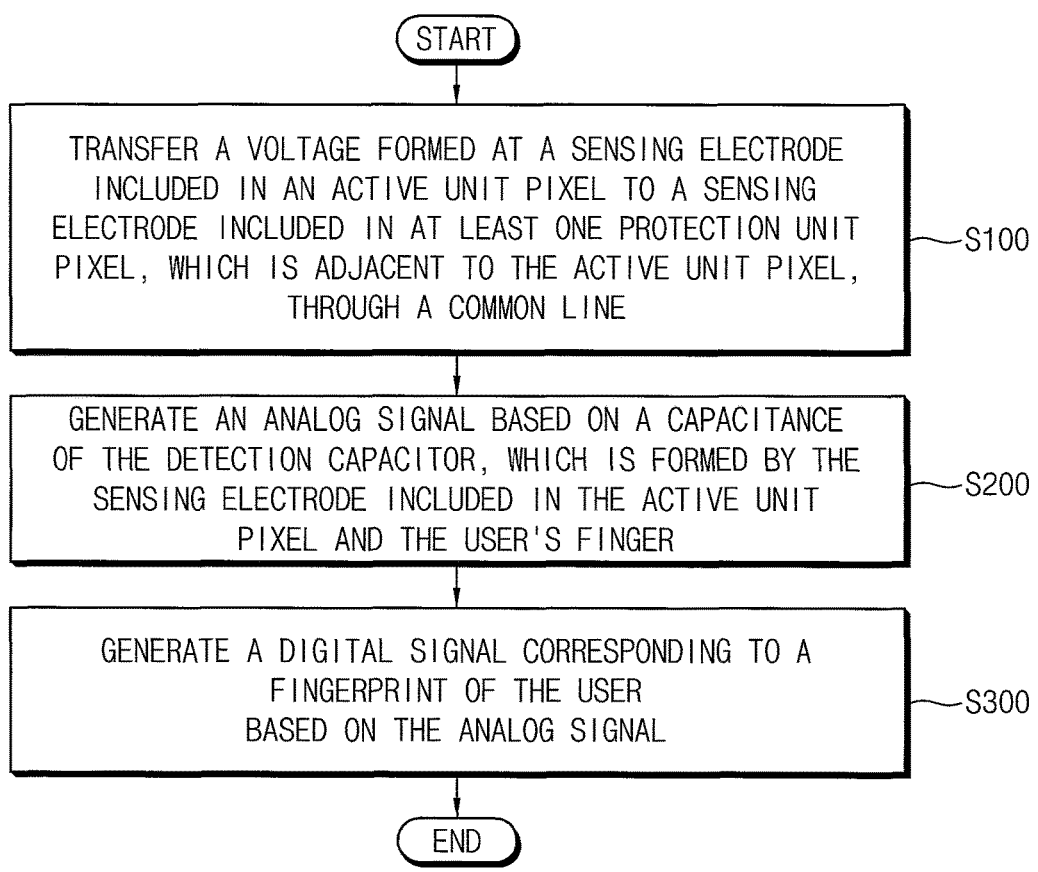
FIG. 12 is a flow chart illustrating a method of operating a fingerprint sensor according to example embodiments.

FIG. 12 is a flow chart illustrating a method of operating a fingerprint sensor according to example embodiments.

The method of operating a fingerprint sensor of FIG. 12 may be performed by the fingerprint sensor 10 of FIG. 1.

Hereinafter, a method of operating the fingerprint sensor 10 will be described with reference to FIGS. 1 to 12.

Referring to FIG. 12, when the finger contacts the pixel array 100, the fingerprint sensor 10 may transfer the detection voltage VSE formed at the sensing electrode 210 included in the active unit pixel 200-1, on which a sensing operation is performed, among the plurality of unit pixels 200 to the sensing electrode 210 included in the at least one protection unit pixel 200-2, which is adjacent to the active unit pixel 200-1, among the plurality of unit pixels 200 through the corresponding common line CMLk (step S100).

After that, the fingerprint sensor 10 may generate an analog signal based on the capacitance of the detection capacitor D_C, which is formed by the sensing electrode 210 included in the active unit pixel 200-1 and the user's finger (step S200), and generate a digital signal DS corresponding to a fingerprint of the user based on the analog signal (step S300).

A structure and an operation of the fingerprint sensor 10 are described above with reference to FIGS. 1 to 11. Therefore, a detailed description of the steps of FIG. 12 will be omitted.

Figure 13:
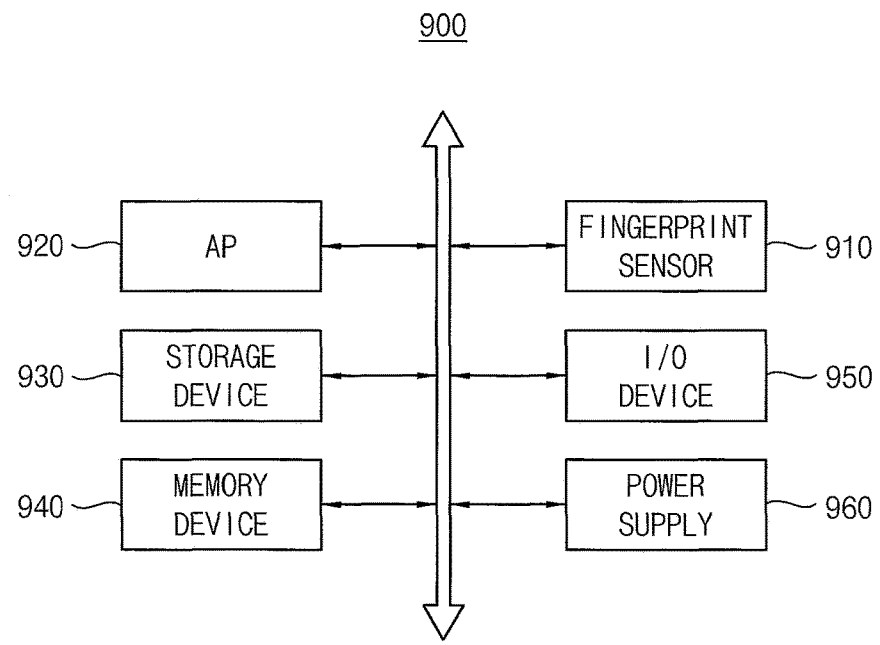
FIG. 13 is a block diagram illustrating an electronic device according to an example embodiment.

FIG. 13 is a block diagram illustrating an electronic device according to an example embodiment.

Referring to FIG. 13, an electronic device 900 includes a fingerprint sensor 910, an application processor AP 920, a storage device 930, a memory device 940, an input/output device 950, and a power supply 960. Although it is not illustrated in FIG. 13, the electronic device 900 may further include ports that communicate with a video card, a sound card, a memory card, a universal serial bus (USB) device, or other electronic devices.

The fingerprint sensor 910 detects a fingerprint of a user and generates a digital signal representing the detected fingerprint. For example, the fingerprint sensor 910 may include a plurality of unit pixels having a sensing electrode. The fingerprint sensor 910 may transfer a voltage formed at the sensing electrode included in an active unit pixel, on which a sensing operation is performed, among the plurality of unit pixels to the sensing electrode included in at least one protection unit pixel, which is adjacent to the active unit pixel, among the plurality of unit pixels, and generates a digital signal based on a capacitance of a detection capacitor, which is formed by the sensing electrode included in the active unit pixel and a user's finger.

The fingerprint sensor 910 may be implemented as the fingerprint sensor 10 of FIG. 1. A structure and an operation of the fingerprint sensor 10 are described above with reference to FIGS. 1 to 12. Therefore, a detailed description of the fingerprint sensor 910 will be omitted.

The application processor 920 controls overall operations of the electronic device 900. The application processor 920 may execute applications, such as a web browser, a game application, a video player, etc. In some example embodiments, the application processor 920 may include a single core or multiple cores. For example, the application processor 920 may be a multi-core processor, such as a dual-core processor, a quad-core processor, a hexa-core processor, etc. The application processor 920 may include an internal or external cache memory.

The storage device 930 may store a boot image for booting the electronic device 900. For example, the storage device 930 may include a nonvolatile memory device such as a flash memory device, a solid state drive (SSD), etc.

The memory device 940 may store data required for an operation of the electronic device 900. For example, the memory device 940 may include a volatile memory device such as a dynamic random access memory (DRAM), a static random access memory (SRAM), etc.

The input/output device 950 may include an input device such as a touch screen, a keypad, etc., and an output device such as a speaker, a display device, etc. The power supply 960 may supply operational power to the electronic device 900.

In some example embodiments, the application processor 920 may authenticate the user based on the digital signal generated by the fingerprint sensor 910. For example, the storage device 930 may store digital data representing a fingerprint pattern of an allowed user of the electronic device 900. When the application processor 920 receives the digital signal representing a fingerprint pattern of a current user from the fingerprint sensor 910, the application processor 920 may compare the digital signal with the digital data stored in the storage device 930 to determine whether the current user is the allowed user.

In some example embodiments, the electronic device 900 may be arbitrary mobile devices, such as a mobile phone, a smart phone, a personal digital assistant (PDA), a portable multimedia player (PMP), a digital camera, a camcorder, a music player, a portable game console, a navigation system, a laptop computer, etc.

Figure 14:
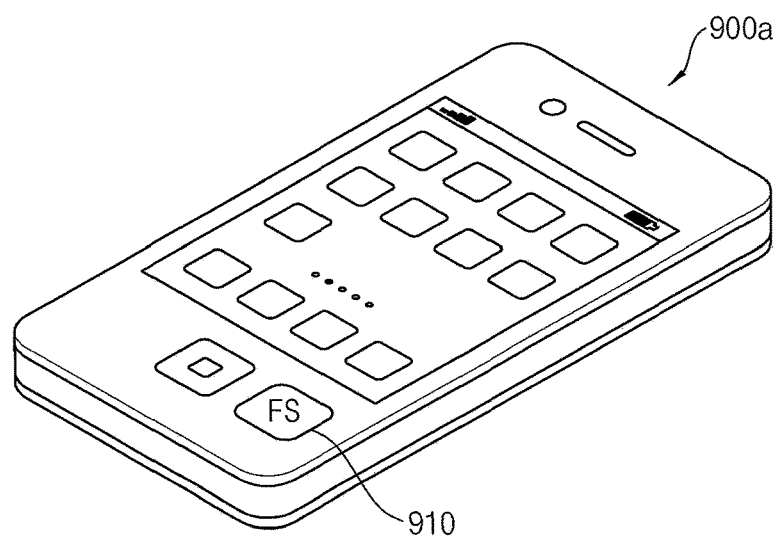
FIG. 14 is a diagram illustrating an example in which the electronic device of FIG. 13 is implemented as a smart phone.

FIG. 14 is a diagram illustrating an example in which the electronic device of FIG. 13 is implemented as a smart phone.

Referring to FIGS. 13 and 14, the fingerprint sensor FS 910 included in a smart phone 900a may generate a digital signal representing a fingerprint pattern of a current user by performing operations described above with reference to FIGS. 1 to 12.

The application processor 920 may determine whether the current user is an allowed user based on whether the digital signal received from the fingerprint sensor 910 is the same as the digital data stored in the storage device 930.

Although the fingerprint sensor 910 is located at a bottom part of a front face of the smart phone 900a in FIG. 14, example embodiments are not limited thereto. According to example embodiments, the fingerprint sensor 910 may be located at any part of the smart phone 900a.

The foregoing is illustrative of inventive concepts and is not to be construed as limiting thereof. Although a few example embodiments have been described, those skilled in the art will readily appreciate that many modifications are possible in the example embodiments without materially departing from the novel teachings and advantages of inventive concepts. Accordingly, all such modifications are intended to be included within the scope of inventive concepts as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A fingerprint sensor, comprising:
 a pixel array including a plurality of unit pixels arranged in rows and columns, each of the plurality of unit pixels including,
  a sensing electrode configured to form a detection capacitance with a finger;
  a signal generation circuit configured to output an analog signal through a column line based on the detection capacitance; and
  a protection circuit configured to control a voltage transfer between the sensing electrode and a common line; and
 a controller configured to control an operation of the pixel array, the controller being configured to control the protection circuit in each of the plurality of unit pixels to transfer a voltage at the sensing electrode of an active unit pixel to the sensing electrode of at least one protection unit pixel through the common line, the active unit pixel being of the plurality of unit pixels, the at least one protection unit pixel being of the plurality of unit pixels, the at least one protection unit pixel being adjacent to the active unit pixel and the active pixel unit being a sensed unit pixel.

2. The fingerprint sensor of claim 1, wherein the protection circuit includes:
   a buffer including an input electrode coupled to the sensing electrode;
   a first protection switch operably coupled between an output electrode of the buffer and a first node on the common line, the first protection switch configured to operate in response to a first protection signal; and
   a second protection switch operably coupled between the first node on the common line and the sensing electrode, the second protection switch configured to operate in response to a second protection signal.

3. The fingerprint sensor of claim 2, wherein the controller is configured to provide the first protection signal and the second protection signal to each of the plurality of unit pixels.

4. The fingerprint sensor of claim 2, wherein the controller is configured to determine one of the rows in the pixel array as an active row, and determine at least one row adjacent to the active row as a protection row.

5. The fingerprint sensor of claim 4, wherein the controller is configured to,
   provide the first protection signal in an activated state and the second protection signal in an inactivated state to the active unit pixel in the active row,
   provide the first protection signal in the inactivated state and the second protection signal in the activated state to the at least one protection unit pixel, the at least one protection unit pixel being in the protection row, and
   provide the first protection signal in the inactivated state and the second protection signal in the inactivated state to an inactive unit pixel in inactive rows, the inactive rows being rows other than the active row and the protection row among the rows in the pixel array.

6. The fingerprint sensor of claim 4, wherein the controller is configured to determine one row adjacent to the active row in a first column direction and one row adjacent to the active row in a second column direction as first and second protection rows.

7. The fingerprint sensor of claim 4, wherein the controller is configured to determine at least two rows adjacent to the active row in a first column direction and at least two rows adjacent to the active row in a second column direction as first and second protection rows.

8. The fingerprint sensor of claim 2, wherein the protection circuit further includes:
   a first connection switch on the common line in a first direction from the first node, the first connection switch configured to operate in response to a first connection signal; and
   a second connection switch on the common line in a second direction from the first node, the second connection switch configured to operate in response to a second connection signal.

9. The fingerprint sensor of claim 8, wherein the controller is configured to provide the first protection signal, the second protection signal, the first connection signal, and the second connection signal to each of the plurality of unit pixels.

10. The fingerprint sensor of claim 8, wherein the controller is configured to provide the first protection signal, the first connection signal, and the second connection signal to each of the plurality of unit pixels, and the protection circuit further includes an inverter configured to invert the first protection signal to generate the second protection signal.

11. The fingerprint sensor of claim 8, wherein the controller is configured to determine one of the rows in the pixel array as an active row, determine one row adjacent to the active row in a first column direction as a first protection row, and determine one row adjacent to the active row in a second column direction as a second protection row.

12. The fingerprint sensor of claim 11, wherein the at least one protection unit pixel is a plurality of protection unit pixels and the controller is configured to,
   provide the first protection signal in an activated state, the second protection signal in an inactivated state, the first connection signal in the activated state, and the second connection signal in the activated state to the active unit pixel in the active row,
   provide the first protection signal in the inactivated state, the second protection signal in the activated state, the first connection signal in the inactivated state, and the second connection signal in the activated state to a first protection unit pixel of the plurality of protection unit pixels, the first protection unit pixel being in the first protection row, and
   provide the first protection signal in the inactivated state, the second protection signal in the activated state, the first connection signal in the activated state, and the second connection signal in the inactivated state to a second protection unit pixel of the plurality of protection unit pixels, the second protection unit pixel being in the second protection row.

13. The fingerprint sensor of claim 8, wherein the controller is configured to determine one of the rows in the pixel array as an active row, determine at least two rows adjacent to the active row in a first column direction as first protection rows, and determine at least two rows adjacent to the active row in a second column direction as second protection rows.

14. The fingerprint sensor of claim 13, wherein the at least one protection unit pixel is a plurality of protection unit pixels and the controller is configured to,
   provide the first protection signal in an activated state, the second protection signal in an inactivated state, the first connection signal in the activated state, and the second connection signal in the activated state to the active unit pixel in the active row,
   provide the first protection signal in the inactivated state, the second protection signal in the activated state, the first connection signal in the inactivated state, and the second connection signal in the activated state to a first protection unit pixel of the plurality of protection unit pixels in a first last protection row, the first last protection row being a last row in the first column direction among the first protection rows,
   provide the first protection signal in the inactivated state, the second protection signal in the activated state, the first connection signal in the activated state, and the second connection signal in the activated state to a second protection unit pixels of the plurality of protection unit pixels in rows other than the first last protection row among the first protection rows,
   provide the first protection signal in the inactivated state, the second protection signal in the activated state, the first connection signal in the activated state, and the second connection signal in the inactivated state to a third protection unit pixel of the plurality of protection unit pixels in a second last protection row, the second last protection row being a last row in the second column direction among the second protection rows, and provide the first protection signal in the inactivated state, the second protection signal in the activated state, the first connection signal in the activated state, and the second connection signal in the activated state to a fourth protection unit pixel of the plurality of protection unit pixels in rows other than the second last protection row among the second protection rows.

15. The fingerprint sensor of claim 1, wherein the signal generation circuit includes:
    a drive capacitor including a first electrode configured to receive a drive voltage and a second electrode coupled to the sensing electrode;
    a reset transistor including a source coupled to a reset voltage, a drain coupled to the sensing electrode, and a gate configured to receive a reset control signal;
    a drive transistor including a source, a drain coupled to a supply voltage, and a gate coupled to the sensing electrode; and
    a row selection transistor including a drain coupled to the source of the drive transistor, a gate configured to receive a row selection signal, and a source coupled to the column line.

16. The fingerprint sensor of claim 15, wherein the controller is configured to,
    determine one of the rows in the pixel array as an active row, and determine at least one row adjacent to the active row as a protection row,
    provide the row selection signal in an activated state to the active unit pixel in the active row, and provide the row selection signal in an inactivated state to the at least one protection unit pixel, the at least one protection unit pixel being in the protection row, and
    provide the reset control signal in the activated state and the drive voltage having a first voltage level to the active unit pixel in the active row during a reset period, and provide the reset control signal in the inactivated state and the drive voltage having a second voltage level lower than the first voltage level to the active unit pixel in the active row during a detection period.

17. The fingerprint sensor of claim 1, further comprising:
    an analog-to-digital converter configured to perform an analog-to-digital conversion operation on the analog signal.

18. An electronic device, comprising:
    a fingerprint sensor including a plurality of unit pixels having a sensing electrode, the fingerprint sensor being configured to transfer a voltage at the sensing electrode of an active unit pixel to the sensing electrode of at least one protection unit pixel through a common line, the active unit pixel being of the plurality of unit pixels, the at least one protection unit pixel being of the plurality of unit pixels, the at least one protection unit pixel being adjacent to the active unit pixel, the active unit pixel being a sensed unit pixel, and the fingerprint sensor further configured to generate a digital signal based on a detection capacitance, the detection capacitance being formed by the sensing electrode of the active unit pixel and a user's finger; and
    an application processor configured to authenticate the user based on the digital signal.

19. An image sensor comprising:
    a pixel array including a plurality of unit pixels, a plurality of common lines and a plurality of column lines, the plurality of unit pixels operably connected to the plurality of common lines and the plurality of column lines; and
    a controller, the controller configured to,
        determine at least one of the plurality of unit pixels as an active unit pixel, the active unit pixel being contacted by an object, and
        control at least one adjacent unit pixel of the plurality of unit pixels to connect to one of the plurality of common lines, the at least one adjacent unit pixel being adjacent to the active unit pixel, the active unit pixel configured to transfer a voltage through the one of the plurality of common lines to the at least one adjacent unit pixel.

20. The image sensor of claim 19, wherein the controller is configured to determine an active row of the pixel array, the active row includes the active unit pixel and the at least one adjacent unit pixel is in an adjacent row to the active row.

* * * * *